US012634487B2

(12) United States Patent
Hendry

(10) Patent No.: US 12,634,487 B2
(45) Date of Patent: May 19, 2026

(54) MEDIA FILE PROCESSING METHOD, AND DEVICE THEREFOR

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/287,579

(22) PCT Filed: Apr. 14, 2022

(86) PCT No.: PCT/KR2022/005393
§ 371 (c)(1),
(2) Date: Oct. 19, 2023

(87) PCT Pub. No.: WO2022/225256
PCT Pub. Date: Oct. 27, 2022

(65) Prior Publication Data
US 2024/0205429 A1     Jun. 20, 2024

Related U.S. Application Data

(60) Provisional application No. 63/176,834, filed on Apr. 19, 2021.

(51) Int. Cl.
H04N 19/70          (2014.01)
H04N 19/169         (2014.01)
H04N 19/172         (2014.01)

(52) U.S. Cl.
CPC .................................. H04N 19/188 (2014.11)

(58) Field of Classification Search
None
See application file for complete search history.

(56) References Cited

U.S. PATENT DOCUMENTS

2015/0373345 A1*  12/2015  Ramasubramonian ......................
H04N 19/105
375/240.26
2020/0154116 A1*  5/2020  Wang ...............  H04N 21/85406

FOREIGN PATENT DOCUMENTS

JP        2017-523669 A      8/2017
KR    10-2017-0022997 A      3/2017
(Continued)

OTHER PUBLICATIONS

International Search Report and Written Opinion in International Appln. No. PCT/KR2022/005393, mailed on Jul. 26, 2022, 13 pages (with English translation).

(Continued)

*Primary Examiner* — Samuel D Fereja
(74) *Attorney, Agent, or Firm* — Fish & Richardson P.C.

(57)          ABSTRACT

According to one embodiment of the present document, a method by which a media file processing device processes a media file is provided. The method comprises the steps of: restoring a sequence of access units for a first OLS; determining whether a first condition and a second condition are true; and inserting, on the basis that the first condition and the second condition are true, as many EOS NAL units as the number of layers applied to the first OLS, wherein the first condition is about whether an OLS differing from the first OLS is selected after the sequence of the access units, and the second condition is about whether the sequence of the access units does not end with an EOS NAL unit or does not end with an EOB NAL unit in each layer of the first OLS.

3 Claims, 14 Drawing Sheets

(56) References Cited

FOREIGN PATENT DOCUMENTS

| KR | 10-2019-0013763 | A | 2/2019 |
| WO | WO 2020/254720 | A1 | 12/2020 |
| WO | WO 2021/061492 | A1 | 4/2021 |

OTHER PUBLICATIONS

Notice of Allowance in Japanese Appln. No. 2023-564071, mailed on Nov. 5, 2024, 4 pages (with English translation).

Wang et al., "AHG9: On EOS NAL units," JVET-S0155-v1, Joint Video Experts Team (JVET) of ITU-T SG 16 WP 3 and ISO/IEC JTC 1/SC 29/WG 11, 19th Meeting, by teleconference, Jun. 22-Jul. 1, 2020, 3 pages.

Extended European Search Report in European Appln. No. 22791956. 0, mailed on Mar. 18, 2025, 10 pages.

ISO/IEC JTC 1/SC 29/WG 03, "Technologies under Consideration for NAL File Format," 1SO/IEC JTC 1/SC 29/WG 03, N0373, Oct. 2021, 37 pages.

ISO/IEC JTC 1/SC 29/WVG 3, "Information technology—Coding of audio-visual objects—Part 15: Carriage of network abstraction layer (NAL) unit structured video in the ISO base media file format," Draft FDIS Stage, ISO/IEC 14496-15:2021(E), 2020, 282 pages.

ISO/IEC JTC 1/SC 29/WG 3, "Technologies under Consideration for ISO/IEC 14496-12," WG 3, MPEG Systems, ISO/IEC JTC 1/SC 29/WG 3, N0009, Virtual, Oct. 2020, 49 pages.

* cited by examiner

FIG. 5

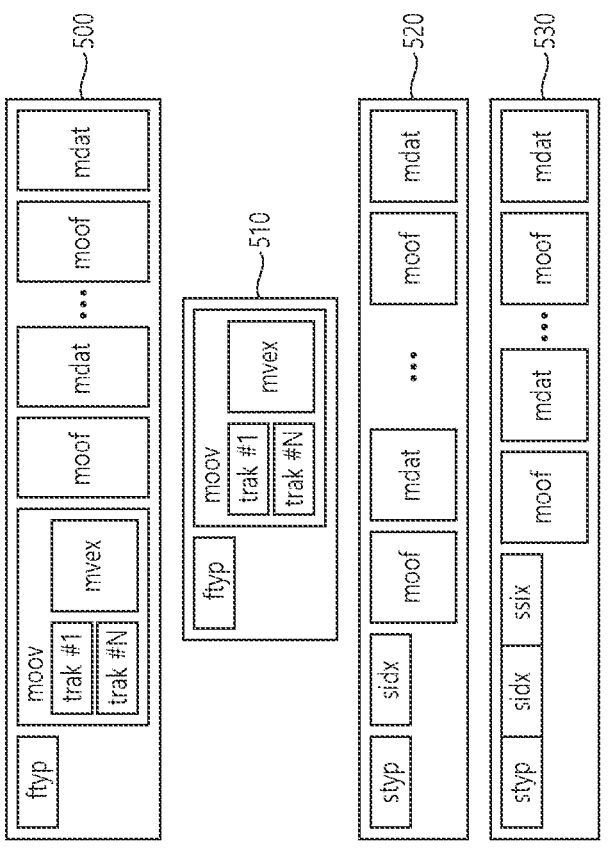

```
aligned(8) class Box (unsigned int(32) boxtype, optional
unsigned int(8)[16] extended_type)
{
    unsigned int(32) size;
    unsigned int(32) type = boxtype;
    if (size==1) {
        unsigned int(64) largesize;
    } else if (size==0) {
        //    box extends to end of file
    }
    if (boxtype=='uuid') {
        unsigned int(8)[16] usertype = extended_type;
    }
} aligned(8) class FullBox(unsigned int(32) boxtype, unsigned int(8)
v, bit(24) f) extends Box(boxtype) {
    unsigned int(8)        version = v;
    bit(24)                flags = f;
}
```

FIG. 7

Reconstruct the sequence of access units for the first OLS ~S1200

Determine whether the first and second conditions are true ~S1210

Insert EOS NAL units as many as the number of layers applied to the first OLS ~S1220

MEDIA FILE PROCESSING METHOD, AND DEVICE THEREFOR

CROSS-REFERENCE TO RELATED APPLICATIONS

This application is a National Stage application under 35 U.S.C. § 371 of International Application No. PCT/KR2022/005393, filed on Apr. 14, 2022, which claims the benefit of U.S. Provisional application Ser. No. 63/176,834, filed on Apr. 19, 2021. The disclosures of the prior applications are incorporated by reference in their entirety.

TECHNICAL FIELD

The present disclosure relates to a video/image coding technique and, more particularly, to a method and an apparatus for processing a media file on coded image information in a video/image coding system.

BACKGROUND

Recently, the demand for high resolution, high quality image/video such as 4K, 8K or more Ultra High Definition (UHD) video/image is increasing in various fields. As the video/image resolution or quality becomes higher, relatively more amount of information or bits are transmitted than for conventional video/image data. Therefore, if video/image data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual video/image, such as game images/videos, are also growing.

Therefore, a highly efficient image compression technique is required to effectively compress and transmit, store, or play high resolution, high quality video/image showing various characteristics as described above.

SUMMARY

The present disclosure provides a method and an apparatus for increasing video/image coding efficiency.

The present disclosure also provides a method and an apparatus for generating a media file for coded image information.

The present disclosure also provides a method and an apparatus for processing the media file for the coded image information.

According to an embodiment of this document, a media file creation method performed by a media file creation device is provided. The method comprises generating a sequence of access units for a first Output Layer Set (OLS), determining whether a first condition and a second condition are true, based on the first condition and the second condition being true, inserting End Of Sequence (EOS) Network Abstraction Layer (NAL) units as many as a number of layers applied to the first OLS, and generating the media file including the first OLS, wherein the first condition is whether an OLS different from the first OLS is selected following the sequence of the access units, and wherein the second condition is whether the sequence of the access units does not end with an EOS NAL unit or an End Of Bitstream (EOB) NAL unit in each layer of the first OLS.

According to another embodiment of this document, a media file creation device is provided. The media file generating device includes a media file generator generating a sequence of access units for a first Output Layer Set (OLS), determining whether a first condition and a second condition are true, based on the first condition and the second condition being true, inserting End Of Sequence (EOS) Network Abstraction Layer (NAL) units as many as a number of layers applied to the first OLS, and generating the media file including the first OLS, wherein the first condition is whether an OLS different from the first OLS is selected following the sequence of the access units, and wherein the second condition is whether the sequence of the access units does not end with an EOS NAL unit or an End Of Bitstream (EOB) NAL unit in each layer of the first OLS.

According to another embodiment of this document, a media file processing method performed by a media file processing device is provided. The method comprises reconstructing a sequence of access units for a first Output Layer Set (OLS), determining whether a first condition and a second condition are true, and based on the first condition and the second condition being true, inserting End Of Sequence (EOS) Network Abstraction Layer (NAL) units as many as a number of layers applied to the first OLS, wherein the first condition is whether an OLS different from the first OLS is selected following the sequence of the access units, and wherein the second condition is whether the sequence of the access units does not end with an EOS NAL unit or an End Of Bitstream (EOB) NAL unit in each layer of the first OLS.

According to another embodiment of this document, a media file processing device is provided. A media file processing apparatus comprises a receiver which acquires a media file and a media file processer which reconstructs a sequence of access units for a first Output Layer Set (OLS) of the media file, determines whether a first condition and a second condition are true, and based on the first condition and the second condition being true, inserts End Of Sequence (EOS) Network Abstraction Layer (NAL) units as many as a number of layers applied to the first OLS, wherein the first condition is whether an OLS different from the first OLS is selected following the sequence of the access units, and wherein the second condition is whether the sequence of the access units does not end with an EOS NAL unit or an End Of Bitstream (EOB) NAL unit in each layer of the first OLS.

According to still another embodiment of the present disclosure, there is provided a computer-readable digital storage medium which stores a media file generated by a media file generation method. In the computer-readable digital storage medium, the method includes configuring subpicture tracks each including subpicture image data, configuring a base track referencing the subpicture tracks, and generating a media file including the subpicture tracks and the base track, wherein a sample of the base track forms a rectangular area which does not have a hole and an overlap, the hole indicates an area not covered by at least one of samples of the referenced subpicture tracks, and the overlap indicates an area covered two or more times by the referenced subpicture tracks.

According to this document, even if only the maximum temporal ID is changed, unnecessary operation of inserting EOS NAL units can be prevented, thereby improving overall coding efficiency.

According to this document, it is possible to prevent burden that occurs when inserting an EOS NAL unit into an appropriate location within an access unit, thereby improving overall coding efficiency.

BRIEF DESCRIPTION OF THE DRAWINGS

FIGS. 5 and 6 schematically illustrate an example of a media file structure.

FIG. 7 illustrates an example of the overall operation of a DASH-based adaptive streaming model.

MODE

Figure 1:
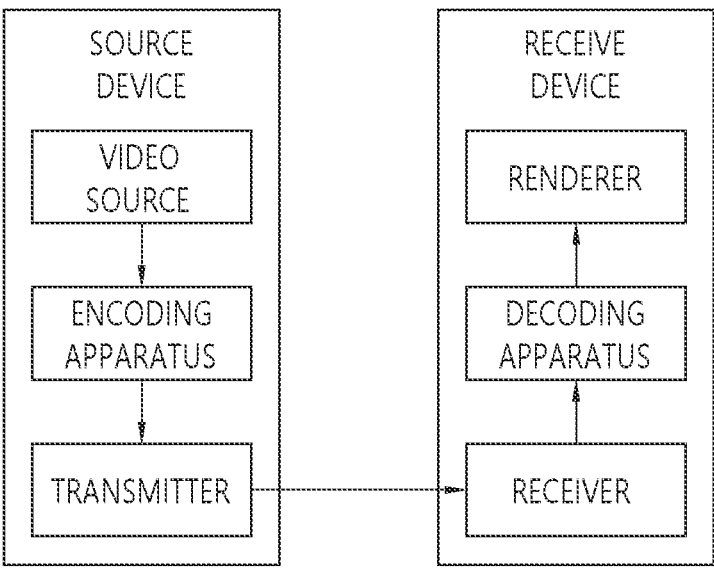
FIG. 1 schematically illustrates an example of a video/image coding system to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals may be used to indicate like elements throughout the drawings, and the same descriptions on the like elements will be omitted.

FIG. 1 schematically illustrates an example of a video/image coding system to which the embodiments of the present document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. Also, a subpicture may represent a rectangular region of one or more slices within a picture. That is, a subpicture may contain one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present disclosure, "A or B" may mean "only A", "only B" or "both A and B". In other words, in the present disclosure, "A or B" may be interpreted as "A and/or B". For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A. B and C". Also, "at least one of A, B or C" or "at least one of A, B and/or C" may mean "at least one of A, B and C".

In addition, parentheses used in the present disclosure may mean "for example". Specifically, when "prediction (intra prediction)" is indicated, "intra prediction" may be proposed as an example of "prediction". In other words, "prediction" in the present disclosure may be not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present disclosure may be implemented individually or may be implemented at the same time.

The following drawings were created to explain a specific example of the present disclosure. Since the names of specific devices described in the drawings or the names of specific signals/messages/fields are presented as an example, the technical features of the present disclosure are not limited to the specific names used in the following drawings.

Figure 2:
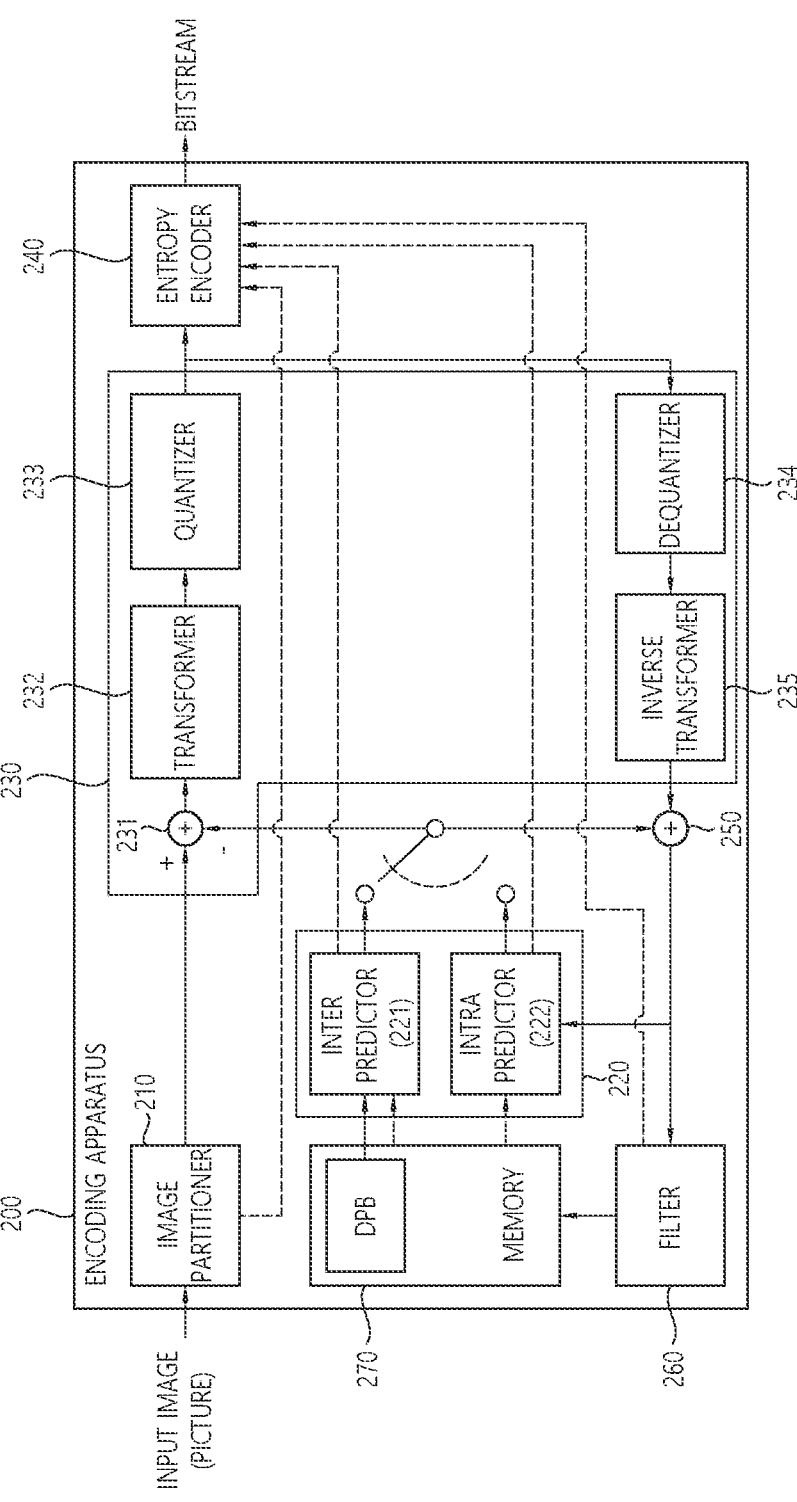
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
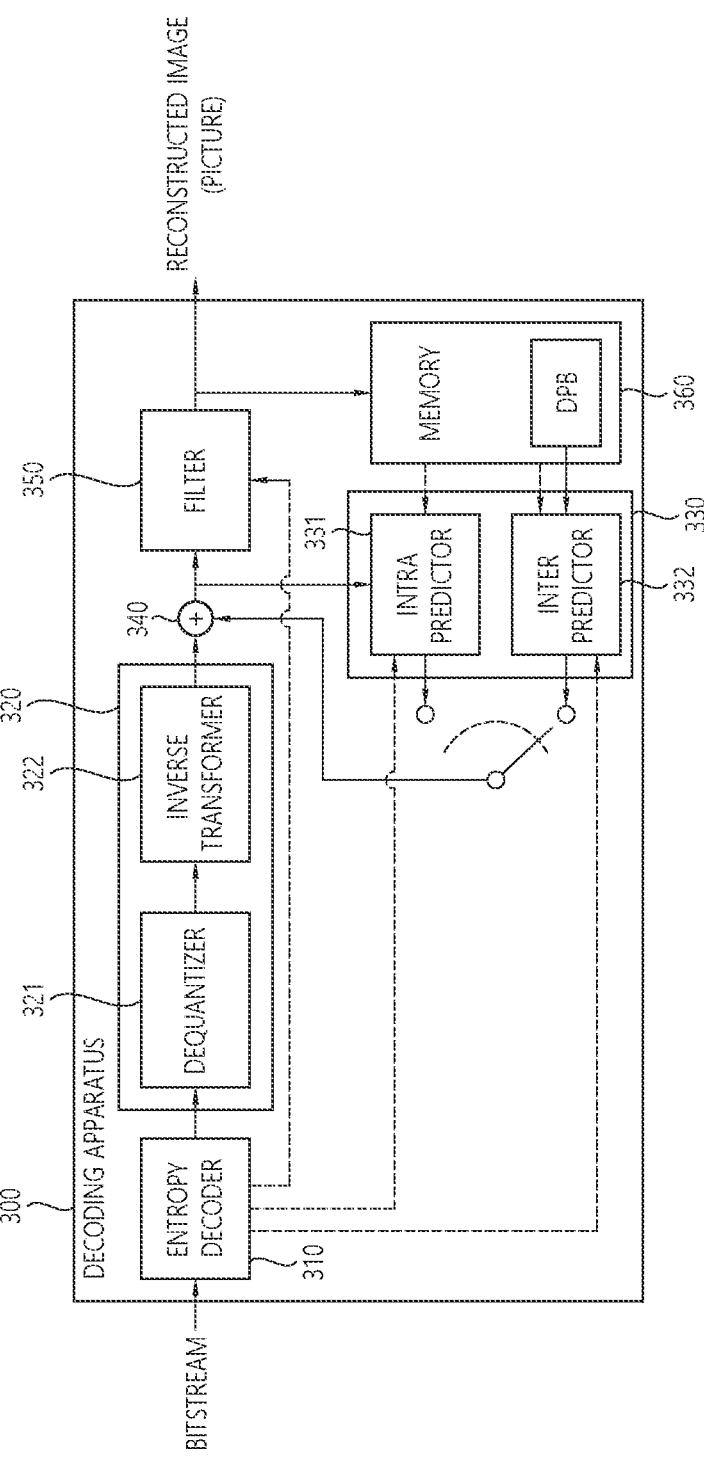
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an intra predictor 331 and an inter predictor 332. The residual processor 320 may include a dequantizer 321 and an inverse transformer 322. The entropy decoder 310, the residual processor 320, the predictor 330, the adder 340, and the filter 350 may be configured by a hardware component (e.g., A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/ blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding. CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture.

For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Figure 4:
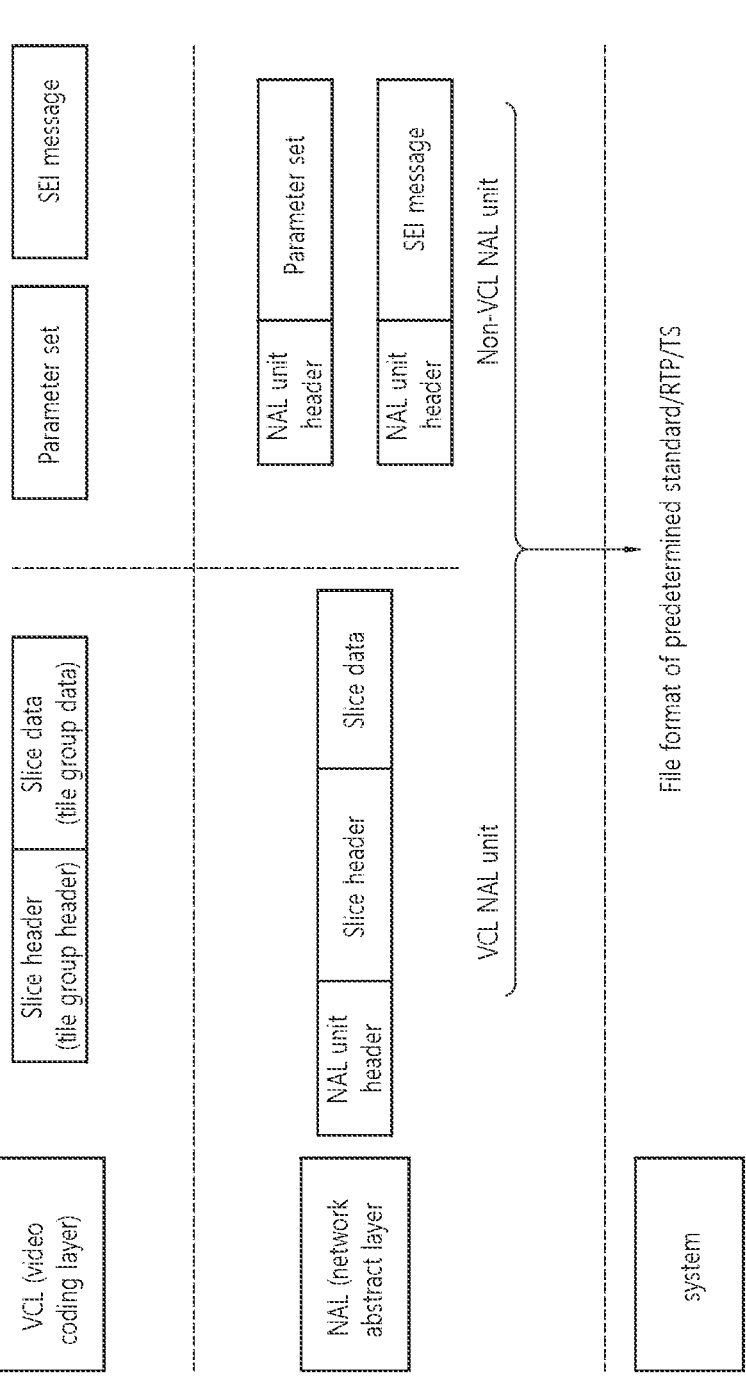
FIG. 4 exemplarily illustrates a layer structure for a coded video/image.

FIG. 4 exemplarily illustrates a layer structure for a coded video/image.

Referring to FIG. 4, a coded video/image may be divided into a video coding layer (VCL) that performs decoding processing of a video/image and handles the decoding processing, a lower system that transmits and stores coded information, and a network abstraction layer (NAL) which exists between the VCL and the lower system, and serves to perform a network adaptation function.

For example, VCL data including compressed image data (slice data), or a picture parameter set (PPS), a sequence parameter set (SPS), or a video parameter set (VPS), or a parameter set including a supplemental enhancement information (SEI) message additionally required in an image decoding process may be generated, in the VCL.

For example, in the NAL, header information (NAL unit data) is added to a raw byte sequence payload (RSRP) generated in the VCL to generate the NAL unit. In this case, the slice data, the parameter set, the SEI message, etc., generated in the VCL may be referred to, for the RBSP. The NAL unit header may include NAL unit type information specified according to RSRP data included in the corresponding NAL unit.

For example, as illustrated in FIG. 4, the NAL unit may be classified into a VCL NAL unit and a non-VCL NAL unit according to the RSRP generated in the VCL. The VCL NAL unit may mean a NAL unit including information (slice data) on the information, and the non-VCL NAL unit may mean a NAL unit including information (parameter set or SEI message) required to decode the image.

The VCL NA unit and the non-VCL NAL unit may be transmitted through a network while header information is added according to a data standard of a sub system. For example, the NAL unit may be converted into a data format of a predetermined standard such as an H.266/VVC file format, a real-time transport protocol (RTP), a transport stream (TS), etc., and transported through various networks.

Further, as described above, in respect to the NAL unit, a NAL unit type may be specified according to an RBSP data structure included in the corresponding NAL unit, and information on the NAL unit type may be stored in a NAL unit header and signaled.

For example, the NAL unit may be classified into a VCL NAL unit type and a non-VCL NAL unit type according to whether the NAL unit includes information (slice data) on the image. Further, the VCL NAL unit type may be classified according to a property and a type of picture included in the VCL NAL unit and the non-VCL NAL unit may be classified according to the type of parameter set.

The following is an example of the NAL unit type specified according to the type of parameter set included in the non-VCL NAL unit type.

Adaptation Parameter Set (APS) NAL unit: Type for the NAL unit including the APS Decoding Parameter Set (DPS) NAL unit: Type for the NAL unit including the DPS Video Parameter Set (VPS) NAL unit: Type for the NAL unit including the VPS Sequence Parameter Set (SPS) NAL unit: Type for the NAL unit including the SPS Picture Parameter Set (PPS) NAL unit: Type for the NAL unit including the PPS Picture header (PH) NAL unit: Type for the NAL unit including the PH The above-described NAL unit types may have syntax information for the NAL unit type and the syntax information may be stored in the NAL unit header and signaled. For example, the syntax information may be nal_unit_type and the NAL unit type may be specified as a value of nal_unit_type.

Meanwhile, one picture may include a plurality of slices, and the slice may include a slice header and slice data. In this case, one picture header may be added for the plurality of slices (a set of the slice header and the slice data). The picture header (picture header syntax) may include information/parameters which may be commonly applied to a picture. The slice header (slice header syntax) may include information/parameters which may be commonly applied to a slice. APS (ASP syntax) or PPS (PPS syntax) may include information/parameters which may be commonly applied to one or more slices or pictures. SPS (SPS syntax) may include information/parameters which may be commonly applied to one or more sequences. VPS (VPS syntax) may include information/parameters which may be commonly applied to a plurality of layers. DPS (DPS syntax) may include information/parameters which may be commonly applied to an overall image. The DPS may include information/parameter related to concatenation of a coded video sequence (CVS).

In the present disclosure, the image/video information encoded from the encoding apparatus to the decoding apparatus and signaled in the form of the bitstream may include intra-picture partitioning related information, intra/inter prediction information, interlayer prediction related information, residual information, and in-loop filtering information, and may include information included in the APS, information included in the PPS, information included in the SPS, information included in the VPS, and/or information included in the DPS. Further, the image/video information may further include information of the NAL unit header.

Meanwhile, the above-described encoded image/video information may be configured based on a media file format in order to generate the media file. For example, the encoded image/video information may form a media file (segment) based on one or more NAL units/sample entries for the encoded image/video information. The media file may include a sample entry and a track. For example, the media file (segment) may include various records, and each record information related to an image/video or information related to the media file format. Further, for example, one or more NAL units may be stored in a configuration record (or decoder configuration record, or VVC decoder configuration record) field of the media file. Here, the field may also be called a syntax element.

For example, as a media file format to which the method/embodiment disclosed in the present disclosure may be applied, ISO Base Media File Format (ISOBMFF) may be used. The ISOBMFF may be used based on a lot of codec encapsulation formats such as an AVC file format, an HEVC file format, and/or a VVC file format and a lot of multimedia container formats such as an MPEG-4 file format, a 3GPP file format (3GP), and/or a DVB file format. Further, static media and metadata such as the image may be stored in a file according to the ISOBMFF in addition to continuous media such as audio and video. A file structuralized according to the ISOBMFF may be used for various purposes including local media file playback, progressive downloading of a remote file, segments for dynamic adaptive streaming over HTTP (DASH), containers and packetization instructions of contents to be streamed, recording of received real-time media streams, etc.

A 'box' to be described below may be an elementary syntax element of the ISOBMFF. An ISOBMFF file may be constituted by a sequence of boxes, and another box may be included in the box. For example, a movie box (a box in which a grouping type is 'moov') may include metadata for continuous media streams including the media file, and each stream may be displayed as the track in the file. The metadata may be included in a track box (a box in which the grouping type is 'trak'), and a media content of the track may be included in a media data box (a box in which the grouping type is 'mdat') or directly included in a separate file. The media content of the track may be constituted by a sequence of samples such as audio or video access units. For example, the ISOBMFF may specify tracks of types such as a media track including an elementary media stream, a hint track including media transmission instructions or representing a received packet stream, and a timed metadata track including time synchronized metadata.

Further, the ISOBMFF is designed for a storage usage, but is very useful even for streaming such as progressive download or DASH, for example. Movie fragments defined in the ISOMBFF may be used for a streaming usage. A fragmented ISOMBFF file may be represented by two tracks related to the video and the audio, for example. For example, when a random access is included after receiving the 'moov' box, all movie fragments 'moof' may be decoded together with related media data.

Further, the metadata of each track may include a coding or encapsulation format used for the track and a list of sample description entries providing initialization data required for processing the corresponding format. Further, each sample may be concatenated to one of the sample description entries of the track.

When the ISOBMFF is used, sample-specific metadata may be specified by various mechanisms. Specific boxes in a sample table box (a box in which the grouping type is 'stb1') may be standardized to cope with general requirements. For example, a sync sample box (a box in which the grouping type is 'stss') may be used for listing random access samples. When a sample grouping mechanism is used, samples may be mapped according to a four-character grouping type by a sample group sharing the same property specified as a sample group description entry. Various grouping types may be specified in the ISOBMFF.

Figure 6:
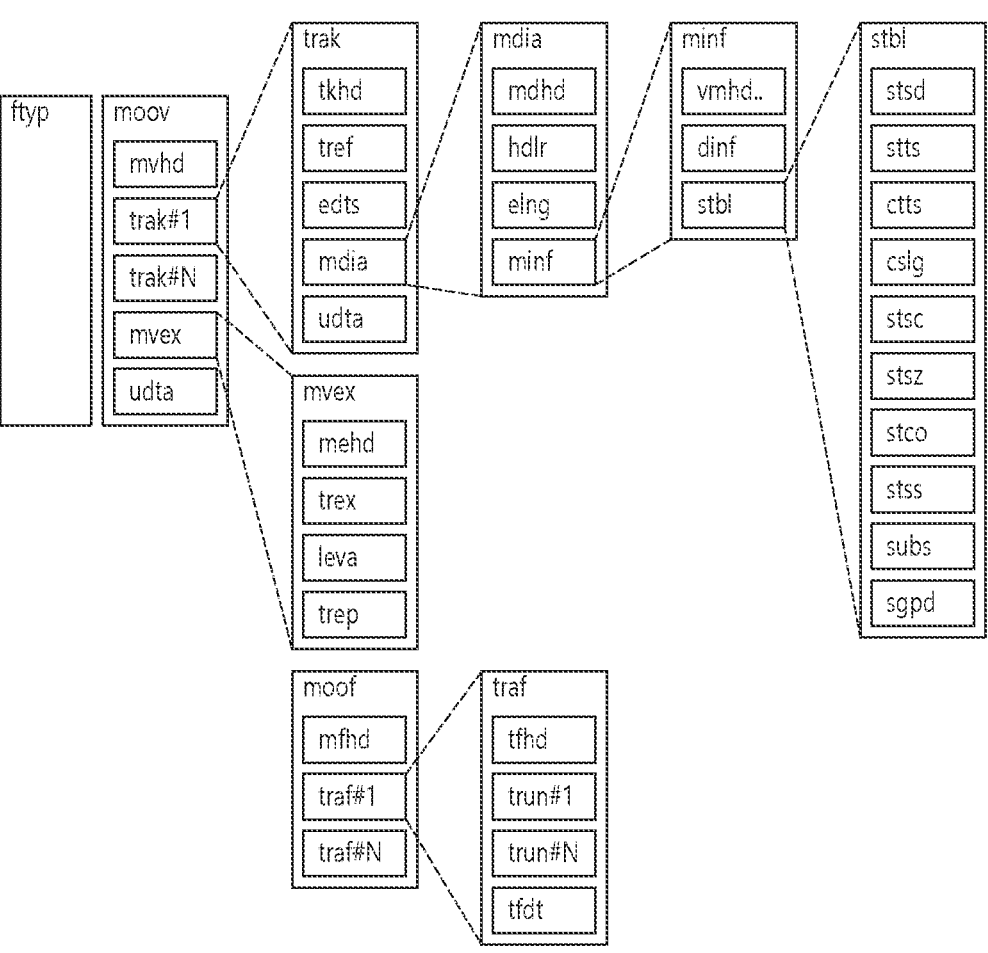

FIGS. 5 and 6 illustrate an example of a media file structure.

A media file may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file may be divided into a plurality of fragments (500). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment (510) may include information related to media decoder initialization except media data. This file may correspond to the aforementioned initialization segment, for example. The initialization segment can include the aforementioned styp box and/or moov box.

A file of the illustrated embodiment (520) may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment (530), an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment (550). In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, fields (properties) for the video/image according to the present disclosure may be forwarded while being included in a DASH based adaptive streaming model.

Figure 7:
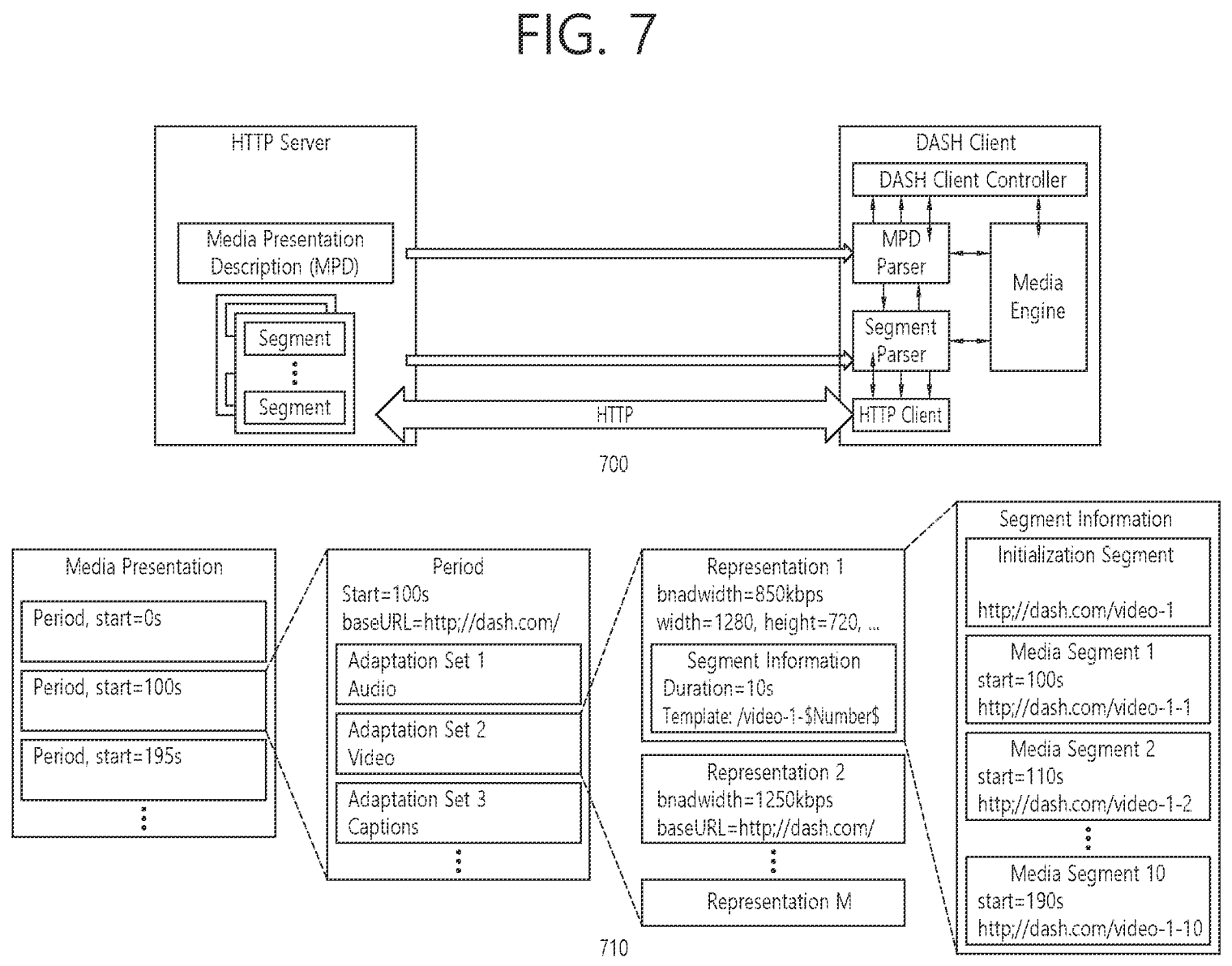

FIG. 7 illustrates an example of the overall operation of a DASH-based adaptive streaming model. The DASH-based adaptive streaming model according to an illustrated embodiment (700) illustrates an operation between an HTTP server and a DASH client. Here, Dynamic Adaptive Streaming over HTTP (DASH) is a protocol for supporting HTTP-based adaptive streaming and can dynamically support streaming according to a network state. Accordingly, AV content may be seamlessly reproduced.

First, the DASH client may acquire an MPD. The MPD may be delivered from a service provider, such as the HTTP server. The DASH client may request a segment from the server using segment access information described in the MPD. Here, this request may be performed in view of the network condition.

After acquiring the segment, the DASH client may process the segment in a media engine and may display the segment on a screen. The DASH client may request and acquire a necessary segment in view of reproduction time and/or the network state in real time (adaptive streaming). Accordingly, content may be seamlessly reproduced.

The media presentation description (MPD) is a file including detailed information for allowing the DASH client to dynamically acquire a segment and may be expressed in XML format.

A DASH client controller may generate a command to request an MPD and/or a segment in view of the network state. In addition, the controller may control acquired information to be used in an internal block, such as the media engine.

An MPD parser may parse the acquired MPD in real time. Accordingly, the DASH client controller can generate a command to acquire a required segment.

A segment parser may parse the acquired segment in real time. Depending on pieces of information included in the segment, internal blocks including the media engine may perform certain operations.

An HTTP client may request a required MPD and/or segment from the HTTP server. The HTTP client may also deliver an MPD and/or segment acquired from the server to the MPD parser or the segment parser.

The media engine may display content on a screen using media data included in the segment. Here, pieces of information of the MPD may be used.

A DASH data model may have a hierarchical structure (710). A media presentation may be described by the MPD. The MPD may describe a temporal sequence of a plurality of periods forming a media presentation. A period may represent one section of media content.

In one section, pieces of data may be included in adaptation sets. An adaptation set may be a collection of a plurality of media content components that can be exchanged with each other. An adaptation set may include a collection of representations. A representation may correspond to a media content component. Within one representation, content may be temporally divided into a plurality of segments, which may be for proper accessibility and delivery. The URL of each segment may be provided to enable access to each segment.

The MPD may provide information related to the media presentation, and a period element, an adaptation set element, and a presentation element may describe a period, an adaptation set, and a presentation, respectively. A representation may be divided into sub-representations, and a sub-representation element may describe a sub-representation.

Common properties/elements may be defined, which may be applied to (included in) an adaptation set, a representation, a sub-representation, or the like. Among the common properties/elements, there may be an essential property and/or a supplemental property.

The essential property may be information including elements that are considered essential in processing media presentation-related data. The supplemental property may be information including elements that may be used for processing the media presentation-related data. Descriptors to be described in the following embodiments may be defined and delivered in an essential property and/or a supplemental property when delivered via the MPD.

Meanwhile, a 'sample' to be described below may be all data related to a single time or a single element of one of three sample arrays (Y, Cb, and Cr) representing the picture. For example, when the terminology 'sample' is used in a context of the track (of the media file format), the 'sample' may mean all data related to the single time of the corresponding track. Here, the time may be a decoding time or a composition time. Further, for example, when the terminology 'sample' is used in the context of the picture, that is, when the 'sample' is used as a terminology of the picture like 'luma sample', the 'sample' may represent the single element in one of three sample arrays representing the picture.

To store VVC content, three types of elementary streams may be defined as follows.

> A video elementary stream that contains VCL NAL units and does not contain parameter sets, DCI or OPI NAL units, Here all parameter sets, DCI and OPI NAL units can be stored in a sample entry or sample entries.
>
> A video and parameter set elementary stream that contains VCL NAL units, may contain parameter sets, DCI or > OPI NAL units, and has a sample entry or sample entries in which the parameter sets, DCI or OPI NAL units are stored.
>
> A non-VCL elementary stream containing non-VCL NAL units synchronized with the elementary stream contained in the video track. Here, the VVC non-VCL track does not contain parameter sets, DCI or OPI NAL units in sample entries.

Meanwhile, the VVC video stream can be defined as follows.

For example, a VVC sample entry may be defined as a sample entry whose sample entry type is 'vvc1' or 'vvi1'. Each sample entry in the VVC track may be a VVC sample entry. A VVC sample entry may include a VVC Configuration Box, defined below. The VVC configuration box may include a VVC decoder configuration record containing decoder configuration information.

Additionally, an optional BitRateBox may be present in the VVC sample entry to signal bit rate information of the VVC video stream. Additionally, when used in MPEG-4, there may also be an extension descriptor that must be inserted into the elementary stream descriptor.

Additionally, as permitted by the ISO Base Media File Format specification, multiple sample entries may be used to display sections of video using different configurations or parameter sets.

If a VVC subpicture track can be consumed without another VVC subpicture track and contains a conforming VVC bitstream, a regular VVC sample entry ('vvc1' or 'vvi1') can be used for the VVC subpicture track. Otherwise, the 'vvs1' sample entry is used for the VVC subpicture track and the following constraints may be applied to the track.

> track_in_movie flag is equal to 0.
>
> A track contains only one sample entry.
>
> Tracks are referenced by one or more VVC base tracks via 'subp' track references.
>
> DCI, OPI, VPS, SPS, PPS, AUD, PH, EOS, EOB and other AU or picture level non-VCL NAL units must be absent from both the sample entry and the samples of the 'vvs1' track.
>
> Unless otherwise specified, child boxes of a video sample entry (e.g. CleanApertureBox and PixelAspectRatioBox) must not be present in the sample entry and are ignored if present.
>
> A sample is not marked as a sync sample unless all VCL NAL units included in the sample comply with the sync sample requirements.
>
> Composition time offset information for samples in track 'vvs1' does not exist.
>
> Subsample information may exist for samples in the 'vvs1' track. If subsample information exists, the subsample information must follow the definition of subsample for VVC.

Additionally, the VVC track may include a 'subp' track reference along with an entry containing one of the track_ID value of the VVC subpicture track or the track_group_id value of the 'alte' track group of the VVC subpicture track. A sample group of type 'spor' can be in each VVC base track. The dedicated sample entry type for the VVC base track can indicate the VVC base track through the codecs MIME parameter of the track type.

Additionally, a sample entry of type 'vvs1' may include VvcNALUConfigBox. If the VVC subpicture track is referenced by a VVC base track containing a 'spor' sample group description entry with subpic_id_info_flag equal to 1, the VVC subpicture track may potentially include a subpicture ID sample group description using a default sample grouping mechanism.

Additionally, if the sample entry name is 'vvc1' or 'vvi1', the stream to which this sample item applies may be a compliant VVC stream as seen by a VVC decoder operating on the configuration provided in the VVCConfigurationBox (including profile, tier, and level).

Additionally, if the sample entry name is 'vvc1', the value of array completeness may be equal to 1 for arrays of DCI, VPS, SPS and PPS NAL units, and may be equal to 0 for all other arrays. Additionally, if the sample entry name is 'vvi1', the value of array completeness may be equal to 0 for all arrays.

Additionally, if the track does not contain a VVC bitstream by default and does not indicate a VVC bitstream after checking the 'subp' and 'vvcN' track references (if any exist), the track may contain a track carrying the 'vopi' sample group or an 'oref' track reference to the Operating Points Entity Group. For example, if a single-layer VVC bitstream contains two temporal sublayers stored in different tracks, a track containing a sublayer with a TemporalId of 1 may contain an 'oref' track reference to a track containing a sublayer with a TemporalId of 0.

Meanwhile, operating point information of the ISO base media file format (ISOBMF) for VVC may be signaled as a sample in a group box having a grouping type of 'vopi' or an entity group having a grouping type of 'opeg'. The operating point information may be needed to identify a sample and a sample entry for each operating point.

Meanwhile, operating point may be a temporal subset of an output layer set (OLS) which is identifiable with an OLS index and a highest value of TemporalId. Each operating point may be related to a profile, a tier, and a level (i.e., PTL) defining a conformance point of the operating point.

Additionally, for example, an operating point entity group may be defined to provide track mapping for an operating point and profile level information of the operating point. If the 'opeg' entity group exists, a file may contain a file-level ExtendedTypeBox with a brand combination that includes the 'unif' brand specified in ISO/IEC 14496-12.

In the case of aggregating samples of tracks mapped to operation points described in the operation point entity group, the implicit reconstruction process does not need to remove any more VCL NAL units to obtain a conforming VVC bitstream. A track belonging to the operation point entity group may have a track reference of type 'oref' for the group_id indicated in the operation point entity group and may not include the 'vopi' sample group.

Additionally, all entity_id values included in the operation point entity group must indicate the track ID of a track belonging to the same VVC bitstream. If present, OperatingPointGroupBox is included in the GroupsListBox of the file-level MetaBox and may not be included in MetaBoxes of other file-level levels. 여기서, OperatingPointGroupBox 는 상기 동작 포인트 엔터티 그룹을 나타낼 수 있다.

The syntax of the operation point entity group described above may be as shown in the table below.

TABLE 1

```
aligned(8) class OperatingPointGroupBox extends
EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    bit(6) reserved = 0;
    unsigned int(1) incomplete_operating_points_flag;
    unsigned int(9) num_olss;
    for (i=0; i<num_olss; i++) {
        unsigned int(8) ptl_idx[i];
        unsigned int(9) ols_idx[i];
        unsigned int(6) layer_count[i];
        bit(1) reserved = 0;
        unsigned int(1) layer_info_present_flag[i];
        if (layer_info_present_flag) {
            for (j=0; j<layer_count; j++) {
                unsigned int(6) layer_id[i][j];
                unsigned int(1) is_output_layer[i][j];
                bit(1) reserved = 0;
            }
        }
    }
    bit(4) reserved = 0;
    unsigned int(12) num_operating_points;
    for (i=0; i<num_operating_points; i++) {
        unsigned int(9) ols_loop_entry_idx;
        unsigned int(3) max_temporal_id;
        unsigned int(1) frame_rate_info_flag;
        unsigned int(1) bit_rate_info_flag;
        if (incomplete_operating_points_flag) {
            unsigned int(1) op_availability_idc;
        }
            else
                bit(1) reserved = 0;
            bit(4) reserved = 0;
            unsigned int(2) chroma_format_idc;
            unsigned int(3) bit_depth_minus8;
            unsigned int(16) max_picture_width;
            unsigned int(16) max_picture_height;
            if (frame_rate_info_flag) {
                unsigned int(16) avg_frame_rate;
                bit(6) reserved = 0;
                unsigned int(2) constant_frame_rate;
            }
            if (bit_rate_info_flag) {
                unsigned int(32) max_bit_rate;
                unsigned int(32) avg_bit_rate;
            }
            unsigned int(8) entity_count;
            for (j=0; j<entity_count; j++)
                unsigned int(8) entity_idx;
    }
}
```

Additionally, semantics for the syntax of the operation point entity group may be as shown in the table below.

TABLE 2 num_profile_tier_level_minus1 plus 1 gives the number of following
  profiles, tier, and level combinations as well as the associated fields.
opeg_ptl[i] specifies the i-th profile, tier, and level structure.
incomplete_operating_points_flag equal to 1 specifies that some
  operating points declared in the structure may be incomplete (i.e., some output
  layer sets or temporal sublayers may be missing in some operating points).
  incomplete_operating_points_flag equal to 0 specifies that all
  operating points declared in the structure are complete (i.e., all output layer
  sets and temporal sublayers associated with the operating points are present in
  the file).

TABLE 2-continued num_olss specifies the number of output layer sets signalled in this syntax
structure. The value of num_olss shall be less than or equal to the value of
TotalNumOlss as specified in ISO/IEC 23090-3.
ptl_idx[i] specifies the zero-based index of the listed profile, tier, and level
structure for the i-th output layer set signalled in this syntax structure.
ols_idx[i] is the output layer set index of the i-th output layer set signalled in
this syntax structure.
layer_count[i] specifies the number of layers in the i-th output layer set
signalled in this syntax structure.
layer_info_present_flag[i] specifies whether the list of layers that belong
to the i-th output layer set is present or not.
layer_id[i][j] specifies the nuh_layer_id value for the j-th layer in the i-th
output layer set signalled in this syntax structure.
is_output_layer[i][j] equal to 1 specifies that the j-th layer is an output
layer in the i-th output layer set signalled in this syntax structure.
is_output_layer[i][j] equal to 0 specifies that the j-th layer in not an
output layer in the i-th output layer set signalled in this syntax structure.
num_operating_points: Gives the number of operating points for which the
information follows. The list of operating points shall include all operating
points that are present in sample entry of tracks representing the bitstream.
    ols_loop_entry_idx is the index to the list of output layer sets signalled in
        this syntax structure for the operating point. The variable olsIdx is set equal to
        ols_idx[ ols_loop_entry_idx ] for the present loop entry.
    max_temporal_id: Gives the maximum TemporalId of NAL units of this
        operating point.
    frame_rate_info_flag equal to 0 indicates that no frame rate information is
        present for the operating point. The value 1 indicates that frame rate
        information is present for the operating point.
    bit_rate_info_flag_equal to 0 indicates that no bitrate information is
        present for the operating point. The value 1 indicates that bitrate information is
        present for the operating point.
    op_availability_idc indicates whether some output layer sets or some
        temporal sublayers are missing for an operating point.
        op_availability_idc equal 0 indicates that the operating point is missing.
        op_availability_idc equal 1 indicates that some temporal sublayers for
        the operating point are missing but some temporal sublayers remain, allowing
        the operating point to be played. When op_availability_idc is equal to 1,
        the maximum TemporalId of NAL units of the operating point is then the one
        indicated in the layer information of the set of tracks needed for decoding the
        operating point. [Ed. (HD): This semantics seems to mean that when the value
        of incomplete_operating_points_flag is equal to 1, all operating point
        in this structure is incomplete, either all layers / sublayers are missing / not
        available or some temporal sublayers are missing. This might be different from
        the intent such that when incomplete_operating_points_flag is equal
        to 1, some, but not necessarily all, operating points are incomplete]
    chroma_format_idc indicates the chroma format that applies to this operating
        point. The following constraints apply for chroma_format_idc:
        -  If this operating point contains only one layer, the value of
            sps_chroma_format_idc, as defined in ISO/IEC 23090-3, shall be the
            same in all SPSs referenced by the VCL NAL units in the VVC
            bitstream of this operating point, and the value of
            chroma_format_idc shall be equal to that value of
            sps_chroma_format_idc.
        -  Otherwise (this operating point contains more than one layer), the
            value of chroma_format_idc shall be equal to the value of
            vps_ols_dpb_chroma_format[ MultiLayerOlsIdx[ olsIdx ] ], as defined
            in ISO/IEC 23090-3.
    bit_depth_minus8 indicates the bit depth that applies to this operating point.
        The following constraints apply for bit_depth_minus8:
        -  If this operating point contains only one layer, the value of
            sps_bitdepth_minus8, as defined in ISO/IEC 23090-3, shall be the
            same in all SPSs referenced by the VCL NAL units in the VVC
            bitstream of this operating point, and the value of
            bit_depth_minus8 shall be equal to that value of
            sps_bitdepth_minus8.
        -  Otherwise(this operating point contains more than one layer), the
            value of bit_depth_minus8 shall be equal to the value of
            vps_ols_dpb_bitdepth_minus8[ MultiLayerOlsIdx[ olsIdx ] ], as
            defined in ISO/IEC 23090-3.
    max_picture_width indicates the maximum picture width, in units of luma
        samples, that applies to this operating point. The following constraints apply for
        max_picture_width:
        -  If this operating point contains only one layer, the value of
            sps_pic_width_max_in_luma_samples, as defined in ISO/IEC 23090-3,
            shall be the same in all SPSs referenced by the VCL NAL units in the
            VVC bitstream of this operating point, and the value of
            max_picture_width shall be equal to that value of
            sps_pic_width_max_in_luma_samples.
        -  Otherwise (this operating point contains more than one layer), the
            value of max_picture_width shall be equal to the value of TABLE 2-continued

```
    vps_ols_dpb_pic_width[ MultiLayerOlsIdx[ olsIdx ] ], as defined in
        ISO/IEC 23090-3.
 max_picture_height indicates the maximum picture height, in units of luma
    samples, that applies to this operating point. The following constraints apply for
    max_picture_height:
        -   If this operating point contains only one layer, the value of
            sps_pic_height_max_in_luma_samples, as defined in ISO/IEC 23090-
            3, shall be the same in all SPSs referenced by the VCL NAL units in
            the VVC bitstream of this operating point, and the value of
            max_picture_height shall be equal to that value of
            sps_pic_height_max_in_luma_samples.
        -   Otherwise (this operating point contains more than one layer), the
            value of max_picture_height shall be equal to the value of
            vps_ols_dpb_pic_height[ MultiLayerOlsIdx[ olsIdx ] ], as defined in
            ISO/IEC 23090-3.
 avg_frame_rate gives the average frame rate in units of frames/(256 seconds)
    for the operating point. Value 0 indicates an unspecified average frame rate.
 constant_frame_rate equal to 1 indicates that the bitstream of the operating
    point is of constant frame rate. Value 2 indicates that the representation of each
    sublayer in the bitstream of the operating point is of constant frame rate. Value
    0 indicates that the bitstream of the operating point may or may not be of
    constant frame rate. [Ed. (HD): Value 3 of this syntax element in 'vopi' is
    reserved. Shouldn't we do the same here?]
 max_bit_rate gives the maximum bit rate in bits/second of the bitstream of the
    operating point, over any window of one second.
 avg_bit_rate gives the average bit rate in bits/second of the bitstream of the
    operating point.
 entity_count specifies the number of tracks that are present in an operating
    point.
 entity_idx specifies the index to the entity_id list in the entity group that
    belongs to an operating point.
```

Additionally, for example, a media file may include a VVC bitstream entity group. A VVC bitstream entity group can be defined to provide a VVC track of a single VVC elementary stream.

For example, if an EntityToGroupBox with grouping_type of 'vvcb' exists, the following constraints may be applied.

1) EntityToGroupBox must be included in the GroupsListBox of the file-level MetaBox and not included in any other level MetaBox.

2) The entity_id value included in EntityToGroupBox represents the track ID of all VVC tracks carrying one VVC elementary stream.

3) The first entity_id value included in EntityToGroupBox represents the track ID of the VVC track carrying the 'vopi' sample group.

4) VVC tracks with a track ID value indicated by the second or later entity_id value contained in the EntityToGroupBox do not carry the 'vopi' sample group.

Moreover, for example, a media file may include decoder configuration information on image/video content. That is, the media file may include a VVC decoder configuration record including the decoder configuration information.

If the VVC decoder configuration record is stored in a sample entry, the VVC decoder configuration record may include the size of a length field used in each sample to indicate the length of the NAL unit included in the VVC decoder configuration record as well as parameter sets, DCI, OPI and SEI NAL units. The VVC decoder configuration record may be externally framed (the size of the VVC decoder configuration record is provided in the structure containing the VVC decoder configuration record).

And, the VVC decoder configuration record may also include a version field. A version in the present disclosure may define version 1 of the VVC decoder configuration record. An incompatible change in the VVC decoder configuration record may be indicated as a version number change. When a version number is not recognized, a reader does not need to decode the VVC decoder configuration record or a stream to which the record applies.

A compatible extension of the VVC decoder configuration record may not change a configuration version code. The reader needs to be ready to ignore unrecognized data which exceeds the definition of data which the reader understands.

If the track primarily contains a VVC bitstream or is resolving through 'subp' track references, a VvcPtlRecord must be present in the decoder configuration record, in this case, the specific output layer set for the VVC bitstream may be indicated by the output_layer_set_idx field. Additionally, if ptl_present_flag in the decoder configuration record of a track is 0, the track must have an 'oref' track reference for an ID that can refer to a VVC track or an 'opeg' entity group.

When the stream described in the VVC decoder configuration record is decoded, the values of the syntax elements of VvcPTLRecord, chroma_format_idc, and bit_depth_minus8 may be valid for all referenced parameter sets. In particular, the following restrictions may be applied.

Profile indication general_profile_idc indicates the profile to which OLS conforms, identified by output_layer_set_idx in the configuration record.

Tier indication general_tier_flag may indicate a tier that is greater than or equal to the highest tier indicated in the profile_tier_level( ) syntax structure (all parameter sets) that OLS complies with, identified by output_layer_set_idx in the configuration record.

Each bit of general_constraint_info can be set only when the bit is set in all general_constraints_info( ) syntax structures in the profile_tier_level( ) syntax structure (all parameter sets) that OLS conforms to, identified by output_layer_set_idx in the configuration record.

The level indication general_level_idc may indicate a level of capability that is equal to or greater than the highest level of profile_tier_level( ) syntax structure (all parameter sets) followed by OLS, identified by output_layer_set_idx in the configuration record.

Additionally, the following constraints may be applied to chroma_format_idc.

If the VVC stream to which the configuration record is applied is a single layer bitstream, the value of sps_chroma_format_idc, defined in ISO/IEC 23090-3, must be the same in all SPSs referenced by the VCL NAL unit of the sample to which the current sample entry description applies, chroma_format_idc must be the same as sps_chroma_format_idc.

Otherwise (if the VVC stream to which the configuration record applies is a multi-layer bitstream), the value of vps_ols_dpb_chroma_format[MultiLayerOlsIdx[output_layer_set_idx]], defined in ISO/IEC 23090-3, must be the same for all CVSs to which the current sample entry description applies, chroma_format_idc must be the same as the value of vps_ols_dpb_chroma_format[MultiLayerOlsIdx[output_layer_set_idx]].

Additionally, the following constraints may be applied to bit_depth_minus8.

If the VVC stream to which the configuration record is applied is a single layer bitstream, the value of sps_bitdepth_minus8, defined in ISO/IEC 23090-3, must be the same in all SPSs referenced by the VCL NAL unit of the sample to which the current sample entry description applies, the value of bit_depth_minus8 must be the same as the value of sps_bitdepth_minus8.

Otherwise (if the VVC stream to which the configuration record applies is a multi-layer bitstream), the value of vps_ols_dpb_bitdepth_minus8[MultiLayerOlsIdx[output_layer_set_idx]], defined in ISO/IEC 23090-3, must be the same for all CVSs to which the current sample entry description applies, the value of bit_depth_minus8 must be the same as the value of vps_ols_dpb_bitdepth_minus8[MultiLayerOlsIdx[output_layer_set_idx]].

Additionally, the following constraints may be applied to picture_width.

If the VVC stream to which the configuration record is applied is a single layer bitstream, the value of sps_pic_width_max_in_luma_samples, as defined in ISO/IEC 23090-3, must be the same in all SPSs referenced by the VCL NAL unit of the sample to which the current sample entry description applies, the value of picture_width must be the same as the value of sps_pic_width_max_in_luma_samples.

Otherwise (if the VVC stream to which the configuration record applies is a multi-layer bitstream), the value of vps_ols_dpb_pic_width[MultiLayerOlsIdx[output_layer_set_idx]], defined in ISO/IEC 23090-3, must be the same for all CVSs to which the current sample entry description applies, the value of picture_width must be the same as the value of vps_ols_dpb_pic_width[MultiLayerOlsIdx[output_layer_set_idx]].

Additionally, the following constraints may be applied to picture_height.

If the VVC stream to which the configuration record is applied is a single layer bitstream, the value of sps_pic_height_max_in_luma_samples, as defined in ISO/IEC 23090-3, must be the same in all SPSs referenced by the VCL NAL unit of the sample to which the current sample entry description applies, the value of picture_height must be the same as the value of sps_pic_height_max_in_luma_samples.

Otherwise (if the VVC stream to which the configuration record applies is a multi-layer bitstream), the value of vps_ols_dpb_pic_height[MultiLayerOlsIdx[output_layer_set_idx]], defined in ISO/IEC 23090-3, must be the same for all CVSs to which the current sample entry description applies, the value of picture_height must be the same as the value of vps_ols_dpb_pic_height[MultiLayerOlsIdx[output_layer_set_idx]].

Explicit indication of chroma format and bit depth, as well as other important format information used in the VVC video elementary stream, can be provided in the VVC decoder configuration record. If the color space or bit depth indications in the VUI information of the two sequences are different, two different VVC sample entries may be needed.

Additionally, the VVC decoder configuration record may have a set of arrays carrying initialization NAL units. The NAL unit types may be limited to represent only DCI, OPI, VPS, SPS, PPS, prefix APS and prefix SEI NAL units. NAL unit types reserved in ISO/IEC 23090-3 and this document may be defined in the future, the reader may need to ignore arrays with reserved or unpermitted values of the NAL unit type.

Meanwhile, the arrays may be in the following order: DCI, OPI, VPS, SPS, PPS, prefix APS, and prefix SEI.

The syntax of the VVC decoder configuration record described above may be as shown in the table below.

TABLE 3

```
aligned(8) class VvcPTLRecord(num_sublayers) {
    bit(2) reserved = 0;
    unsigned int(6) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    unsigned int(8*num_bytes_constraint_info – 2)
general_constraint_info;
    for (i=num_sublayers – 2; i >= 0; i--)
        unsigned int(1) ptl_sublayer_level_present_flag[i];
    for (j=num_sublayers; j<=8 && num_sublayers > 1; j++)
        bit(1) ptl_reserved_zero_bit = 0;
    for (i=num_sublayers–2; i >= 0; i--)
        if (ptl_sublayer_level_present[i])
            unsigned int(8) sublayer_level_idc[i];
    unsigned int(8) num_sub_profiles;
    for (j=0; j < num_sub_profiles; j++)
        unsigned int(32) general_sub_profile_idc[j];
}
aligned(8) class VvcDecoderConfigurationRecord {
    unsigned int(8) configurationVersion = 1;
```

TABLE 3-continued

```
    bit(5) reserved = '11111'b;
    unsigned int(2) lengthSizeMinusOne;
    unsigned int(1) ptl_present_flag;
    if (ptl_present_flag) {
        unsigned int(16) output_layer_set_idx;
        unsigned int(16) avgFrameRate;
        unsigned int(2) constantFrameRate;
        unsigned int(3) numTemporalLayers;
        unsigned int(2) chroma_format_idc;
        unsigned int(3) bit_depth_minus8;
        bit(6) reserved = '111111'b; [Ed. (YK): Curently some reserved bits have
value 1 for each bit, and some reserved bits have value 0 for each bit. Check whether
it'd
be better to have them in a consistent manner.]
        unsigned_int(16) picture_width;
        unsigned_int(16) picture_height;
        VvcPTLRecord(numTemporalLayers) track_ptl;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

Additionally, semantics for the syntax of the VVC decoder configuration record may be as shown in the following table.

TABLE 4 num_bytes_constraint_info is used to specify the length of the
    general_constraint_info field. The length of the
    general_constraint_info field is
    num_bytes_constraint_info * 8 – 2 bits. The value shall be greater than 0.
    The value equal to 1 indicates that the gci_present_flag in the
    general_constraint_info( ) syntax structure represented by the
    general_constraint_info field is equal to 0.
general_profile_idc, general_tier_flag, general_level_idc,
    ptl_frame_only_constraint_flag,
    ptl_multilayer_enabled_flag, general_constraint_info,
    sublayer_level_present[j], sublayer_level idc[i],
    num_sub_profiles, and general_sub_profile_idc[j] contain the
    matching values for the fields or syntax structures general_profile_idc,
    general_tier_flag, general_level_idc, ptl_frame_only_constraint_flag
    ptl_multilayer_enabled_flag, general_constraint_info( ),
    ptl_sublayer_level_present[i], sublayer_level_idc[i], ptl_num_sub_profiles, and
    general_sub_profile_idc[j] as defined in ISO/IEC 23090-3, for the stream to which
    this configuration record applies.
lengthSizeMinusOne plus 1 indicates the length in bytes of the NALUnitLength
    field in a VVC video stream sample in the stream to which this configuration record
    applies. For example, a size of one byte is indicated with a value of 0. The value of
    this field shall be one of 0, 1, or 3 corresponding to a length encoded with 1, 2, or 4
    bytes, respectively.
ptl_present_flag equal to 1 specifies that the track contains a VVC bitstream
    corresponding to the operating point specified by output_layer_set_idx and
    numTemporalLayers and all NAL units in the track belong to that operating
    point. ptl_present_flag equal to 0 specifies that the track may not contain a
    VVC bitstream corresponding to a specific operating point, but rather may contain a
    VVC bitstream corresponding to multiple output layer sets or may contain one or
    more individual layers that do not form an output layer set or individual sublayers
    excluding the sublayer with TemporalId equal to 0.
output_layer_set_idx specifies the output layer set index of an output layer set
    represented by the VVC bitstream contained in the track. The value of
    output_layer_set_idx may be used as the value of the TargetOlsIdx variable
    provided by external means or by an OPI NAL unit to the VVC decoder, as specified
    in ISO/IEC 23090-3, for decoding the bitstream contained in the track.
avgFrameRate gives the average frame rate in units of frames/(256 seconds), for the
    stream to which this configuration record applies. Value 0 indicates an unspecified
    average frame rate. When the track contains multiple layers and samples are
    reconstructed for the operating point specified by output_layer_set_idx and TABLE 4-continued numTemporalLayers, this gives the average access unit rate of the bitstream of
    the operating point.
constantFrameRate equal to 1 indicates that the stream to which this configuration
    record applies is of constant frame rate. Value 2 indicates that the representation of
    each temporal layer in the stream is of constant frame rate. Value 0 indicates that the
    stream may or may not be of constant frame rate. When the track contains multiple
    layers and samples are reconstructed for the operating point specified by
    output_layer_set_idx and numTemporalLayers, this gives the
    indication of whether the bitstream of the operating point has constant access unit
    rate.
numTemporalLayers greater than 1 indicates that the track to which this
    configuration record applies is temporally scalable and the contained number of
    temporal layers (also referred to as temporal sublayer or sublayer in ISO/IEC 23090-
    3) is equal to numTemporalLayers. Value 1 indicates that the track to which this
    configuration record applies is not temporally scalable. Value 0 indicates that it is
    unknown whether the track to which this configuration record applies is temporally
    scalable.
chroma_format_idc indicates the chroma format that applies to this track.
bit_depth_minus8 indicates the bit depth that applies to this track.
picture_width indicates the maximum picture width, in units of luma samples, that
    applies to this track.
picture_height indicates the maximum picture height, in units of luma samples,
    that applies to this track.
track_ptl specifies the profile, tier, and level of the output layer set represented by
    the VVC bitstream contained in the track.
numArrays indicates the number of arrays of NAL units of the indicated type(s).
array_completeness when equal to 1 indicates that all NAL units of the given type
    are in the following array and none are in the stream; when equal to 0 indicates that
    additional NAL units of the indicated type may be in the stream; the permitted values
    are constrained by the sample entry name.
NAL_unit_type indicates the type of the NAL units in the following array (which
    shall be all of that type); it takes a value as defined in ISO/IEC 23090-3; it is
    restricted to take one of the values indicating a DCI, OPI, VPS, SPS, PPS, prefix
    APS or prefix SEI NAL unit.
numNalus indicates the number of NAL units of the indicated type included in the
    configuration record for the stream to which this configuration record applies. The
    SEI array shall only contain SEI messages of a 'declarative' nature, that is, those that
    provide information about the stream as a whole. An example of such an SEI could
    be a user-data SEI.
nalUnitLength indicates the length in bytes of the NAL unit.
nalUnit contains a DCI, OPI, VPS, SPS, PPS, APS or declarative SEI NAL unit, as
    specified in ISO/IEC 23090-3.

Meanwhile, the VVC file format according to the present disclosure defines the following types of tracks.

a) VVC track: A VVC track represents a VVC bitstream by including a NAL unit in a sample and a sample entry and possibly by referencing other VVC tracks including other sublayers of the VVC bitstream and possibly by referencing VVC subpicture tracks. When a VVC track refers to VVC subpicture tracks, the VVC track is referred to as a VVC base track.

b) VVC non-VCL track: APSs carrying ALF, LMCS or scaling list parameters, and other non-VCL NAL units may be stored in the VVC non-VCL track, it can be transmitted through the track separately from the track containing the VCL NAL unit.

c) VVC subpicture track: A VVC subpicture track may include either of the following.

For example, the VVC subpicture track may include a sequence of one or more VVC subpictures.

For example, the VVC subpicture track may include one or more complete slices forming a rectangular area.

A sample of a VVC subpicture track may include either of the following.

For example, the sample of the VVC subpicture track may include one or more complete subpictures specified in ISO/IEC 23090-3, which are contiguous in a decoding order.

For example, the sample of the VVC subpicture track may include one or more complete slices specified in ISO/IEC 23090-3, which form a rectangular area and are contiguous in a decoding order.

VVC subpictures or slices included in a random sample of the VVC subpicture track may be contiguous in decoding order.

The VVC non-VCL track and the VVC subpicture track enable optimal delivery of a VVC video in a streaming application as follows.

For example, the tracks may be respectively carried via independent DASH representations thereof, and a DASH representation including a subset of VVC subpicture tracks and a DASH representation including non-VCL tracks may be required for decoding and rendering of a subset of the tracks. This method may eliminate redundant transmission of APSs and other non-VCL NAL units.

Meanwhile, the data sharing and VVC bitstream reconstruction process can be performed as follows. Here, the output of the process may be a VVC bitstream, which may be referred to as an output bitstream.

For example, a file reader may need to call the process if one or more of the following conditions are true:

i) A VVC bitstream ('vvcb') entity group exists in the file, and the file leader processes the VVC bitstream represented by the entity group to generate an output bitstream.

ii) An operation point ('opeg') entity group exists in the file, and the file leader generates an output bitstream using any operation points described by the entity group.

iii) The file reader extracts a subset of layers or sublayers of the VVC track where ptl_present_flag is 1 to generate an output bitstream.

iv) File reader handles VVC default tracks.

v) The file leader processes VVC tracks that have associated VVC non-VCL tracks.

For example, the process may consist of the following sequence of steps.

1) If the above-mentioned conditions i, ii or iii are true, the operation point is determined at the beginning of the VVC bitstream and may be determined again for any IRAP or GDR access unit.

If the file reader selects an operating point for the first time or selects an operating point different from the one previously selected, the file reader may need to indicate the output layer set index and the highest TemporalId value of the selected operation point to the VVC decoder by including it in an OPI NAL unit (From the first access unit where the operating point is used, if any, to the first NAL unit following the AU delimiter NAL unit) inserted into the output bitstream or through other means.

The following ordering steps may be applied to the sequence of access units in decoding order, starting from the access unit for which the operation point is determined, to the end of the bitstream or access unit. Here, the operation point can be determined exclusively next, which may be earlier in the decoding order.

2) If the VVC bitstream is represented by multiple VVC tracks, the file parser can identify the track required for the selected operation point as follows.

i) If the operation points of the 'opeg' entity group include the selected operation point, the file parser may select the track belonging to the operation point as indicated in the 'opeg' entity group.

ii) If the 'opeg' entity group does not exist (i.e., the 'vopi' sample group exists), the file parser can determine whether the VVC track in the 'vvcb' entity group represents a VVC bitstream. The first entity_id of the 'vvcb' entity group may identify the track containing the 'vopi' sample group. Mapping of operation points to layers and sublayers can be concluded from the 'vopi' sample group. The set of tracks containing the layers and sublayers of the selected operation point, and thus required to decode the selected operation point, can be concluded from the 'linf' sample group present in the VVC track of the VVC bitstream. Since a specific layer or sublayer can be represented by one or more tracks, when identifying the track required for an operation point, it may be selected from a set of tracks that include all of the specific layer or sublayer.

3) The access unit to the output bitstream may be restored in the decoding time order of the selected operation point (if conditions i, ii or iii above are true) or the sample of the VVC base track (if the above-mentioned condition iv is true) or the VVC track required for the VVC track (if the v condition described above is true).

When multiple tracks contain data for an access unit, alignment of each sample in the track may be performed based on sample decoding times.

The sequence of access units can be reconstructed from each sample of the required track by repeatedly calling an implicit reconstruction process described later.

Recovered access units may be placed in the output bitstream in order of increasing decoding time.

4) Additionally, if both of the following conditions are true, the file reader may need to include an EOS NAL unit in each layer of the operation point applied to the output bitstream.

The sequence of access units selects a different operating point than previously selected.

The sequence of access units does not end with an EOS NAL unit or an EOB NAL unit in each layer of the applied operation point.

When a VVC bitstream is displayed as multiple VVC tracks, the decoding time of the samples may require that the access unit order be modified as specified in ISO/IEC 23090-3 once the tracks are combined into a single aligned bitstream, increasing the decoding time.

Additionally, the implicit reconstruction of a VVC bitstream process may be performed as follows. The process may represent the recovery of access units from time-aligned samples with the current decoding time among the following.

Required VVC track(s),

Relevant VVC non-VCL track (if any) and

Referenced VVC subpicture track (if any).

When a VCL NAL unit reconstructs a bitstream containing a sublayer with a TemporalId greater than 0, all lower sublayers (i.e., sublayers in which the VCL NAL unit has a smaller TemporalId) within the same layer may also be included in the resulting bitstream.

Additionally, if the sample(s) with the current decoding time include a VCL NAL unit with a TemporalId greater than the largest TemporalId contained in the selected operation point, the access unit may not be recovered from the current decoding time.

Additionally, when restoring an access unit, picture units of samples with the same decoding time (specified in ISO/IEC 23090-3) may be placed in the access unit in ascending order of the nuh_layer_id value. For example, if a condition applies, the following steps may be performed:

If the sample of the track containing the first picture unit of the sample is marked as belonging to the sample group 'aud' with ols_idx and lower_ols_idx corresponding to the target operation point within the AUD NAL unit. Here, the AUD NAL unit in the 'aud' sample group may be placed in AU as the first NAL unit.

If the samples in the track are marked as belonging to the sample group 'eos' containing ols_idx, max_tid and lower_ols_idx, the EOS NAL unit in the 'eos' sample group corresponding to the target operation point can be placed in the AU at the indicated location. That is, when inserted by the sample group 'aud', it can be placed behind the eos_position-th NAL unit of the reconstructed AU, excluding the AUD NAL unit.

If the samples in the track are marked as belonging to the sample group 'eos' containing ols_idx, max_tid and lower_ols_idx, the EOB NAL unit in the 'eob' sample group corresponding to the target operation point may be placed in the AU after all NAL units (including EOS NAL units) in the AU.

Only picture units of the layer and sublayer at the target operation point can be included in the output bitstream.

Additionally, when restoring an access unit based on the operation point associated with the output layer set index i (in the for loop for num_olss of the 'vopi' sample group), the following may apply.

When restoring access units, for each layer of the output layer set to index j in the range 0 to layer_count[i]−1, if num_ref_sublayers_in_layer_in_ols[i][j] is greater than 0, the VCL NAL unit may belong to a sublayer of a layer in which the VCL NAL unit has a TemporalId less than or equal to Min(num_ref_sublayers_in_layer_in_ols[i][j]−1, max_temporal_id). Here, max_temporal_id is the value of the syntax element corresponding to the operation point and is included in the resulting bitstream, and the necessary track can be selected accordingly.

When restoring access units, for each layer of the output layer set to index j in the range 0 to layer_count[i]−1, if num_ref_sublayers_in_layer_in_ols[i][j] is equal to 0, from all picture units of the reference layer, only IRAP picture units and GDR picture units with ph_recovery_poc_cnt equal to 0 are included in the resulting bitstream and the necessary tracks can be selected accordingly.

Additionally, if the access unit of the VVC track contains an unspecified NAL unit type (NAL units with nal_unit_type in the range UNSPEC_28 . . . UNSPEC_31 (inclusive), i.e. units with nal_unit_type values in the range 28 to 31 as defined in ISO/IEC 23090-3), unspecified NAL unit types may be discarded from the final restored bitstream.

Additionally, if the VVC track contains a 'subp' track reference, each picture unit can be restored as specified in section 11.6.3 of ISO/IEC 23090-3. Additionally, if the VVC track contains a 'recr' track reference, each picture unit may be restored as specified in section 11.6.6 of ISO/IEC 23090-3. The process in section 11.6.3 or 11.6.6 of ISO/IEC 23090-3 may be repeated for each layer of the target operation point in ascending order of nuh_layer_id.

Recovered access units may be placed in the VVC bitstream in order of increasing decoding time.

Since a specific layer or sublayer can be represented by one or more tracks, when identifying the track required for an operation point, it may be selected from a set of tracks that include all of the specific layer or sublayer.

Additionally, a picture unit restoration process from a sample of a VVC track that refers to a VVC subpicture track can be performed as follows. Samples of the VVC track can be resolved into picture units in the following order.

An AUD NAL unit may be included in a picture unit if it is in a sample or a time-aligned sample of an associated VVC non-VCL track. For example, if an AUD NAL unit is present in the sample, it may be the first NAL unit in the sample.

If the sample is the first sample of a sample sequence associated with the same sample entry, the DCI, OPI, parameter set, and SEI NAL unit (if any) included in the sample entry may be included in the picture unit.

If there is an associated VVC non-VCL track and the picture unit is the first picture unit of the access unit recovered from the sample, the next NAL unit is included in the picture unit. If there is at least one NAL unit in the time-aligned sample of EOS_NUT, EOB_NUT, SUFFIX_APS_NUT, SUFFIX_SEI_NUT, FD_NUT, or the associated VVC non-VCL track with nal_unit_type equal to RSV_NVCL 27 (NAL units with the above-described NAL unit types cannot precede the first VCL NAL unit in a picture unit), the above-described NAL units (excluding AUD NAL units) except the first unit may be included in the time-aligned samples of the associated VVC non-VCL track. In other cases, all NAL units of time-aligned samples of the associated VVC non-VCL track may be included.

If the sample has one or more NAL units with nal_unit_type equal to EOS_NUT, EOB_NUT, SUFFIX_APS_NUT, SUFFIX_SEI_NUT, FD_NUT, or RSV_NVCL_27 (NAL units with the above-described NAL unit types cannot precede the first VCL NAL unit in a picture unit), NAL units other than the first unit among the NAL units of a sample may be included in a picture unit, otherwise, all NAL units of the sample may be included in a picture unit.

If the reader selects an operation point, the reader may need to exclude the sample entry and all OPI NAL units stored in the sample from the access units restored in all steps above.

If the VVC track does not refer to a VVC subpicture track, the NAL unit of the sample in the VVC track may be included in the picture unit.

Also, if not, the following can be applied.

Track references may be resolved as specified in clause 11.6.4 of ISO/IEC 23090-3.

The parameter set may be updated if necessary as specified in clause 11.6.5 of ISO/IEC 23090-3.

In the order of VVC subpicture tracks referenced in the 'subp' track reference (if num_subpic_ref_idx of the same group entry of the 'spor' sample group entry mapped to the sample is 0) or in the order specified in the 'spor' sample group entry mapped to the sample (if the num_subpic_ref_idx of the same group entry in the 'spor' sample group entry mapped to the sample is greater than 0), as well as all DCI, OPI, VPS, SPS, PPS, AUD, PH, EOS, EOB NAL units, picture units can be added by the content of time-aligned (at decoding time) resolved samples in each referenced VVC subpicture track except for scalable nesting SEI NAL messages where sn_subpic_flag is 1.

Additionally, if the referenced VVC subpicture track is associated with a VVC non-VCL track, the resolved sample of the VVC subpicture track may include the following NAL unit.

If there is at least one NAL unit in the time-aligned sample of EOS_NUT, EOB_NUT, SUFFIX_APS_NUT, SUFFIX_SEI_NUT, FD_NUT, or the associated VVC non-VCL track with nal_unit_type equal to RSV_NVCL_27 (NAL units with the above-described NAL unit types cannot precede the first VCL NAL unit in a picture unit), NAL units described above (excluding AUD NAL units) excluding the first unit in the time-aligned samples of the associated VVC non-VCL track.

Otherwise, all NAL units of time-aligned samples of the associated VVC non-VCL track.

NAL units from samples of the referenced VVC subpicture track.

Remaining NAL units (if any) in the time-aligned samples of the associated VVC non-VCL track.

All NAL units in the sample with nal_unit_type of EOS_NUT, EOB_NUT, SUFFIX_APS_NUT, SUFFIX_SEI_NUT, FD_NUT, or RSV_NVCL_27.

If there is an associated VVC non-VCL track and the picture unit is the last picture unit of the access unit recovered from the sample, all NAL units of time-aligned samples of the associated VVC non-VCL track with nal_unit type of EOS_NUT, EOB_NUT, SUFFIX_APS_NUT, SUFFIX_SEI_NUT, FD_NUT, or RSV_NVCL_27.

All NAL units or NAL unit-like structures in samples with nal_unit_type in the range UNSPEC_28 . . . UNSPEC_31 (inclusive) may be deleted.

Meanwhile, the sample group disclosed in this document may include the following sample groups.

For example, a stream access point sample group may be defined. The Stream Access Point (SAP) sample group 'sap' specified in ISO/IEC 14496-12 can be used to provide information about all SAPs.

For example, if layer_id_method_idc is 0, SAP can be interpreted as follows.

If the sample entry type is 'vvc1' or 'vvi1' and the track does not contain a sublayer with TemporalId of 0, SAP can specify access to all sublayers in the track.

Otherwise, SAP can specify access to any layer in the track.

Additionally, for example, a GDR picture of a VVC bitstream may be generally displayed as SAP type 4 in the 'sap' sample group.

Also, for example, if a sample in a VVC track refers to a PPS with pps_mixed_nalu_types_in_pic_flag equal to 1, for each subpicture index i ranging from 0 to sps_num_sub-pics_minus1, sps_subpic_treated_as_pic_flag[i] is 1, there is at least one IRAP subpicture with the same subpicture index i in the same CLVS or following the current sample, then the following may be applied.

The sample may be marked as a SAP sample of type 4.

Samples may be mapped to a 'roll' sample group description entry with a roll_distance value modified for the decoding process to omit decoding of subpictures with a specific subpicture index before an IRAP subpicture exists.

If a SAP sample group is used, it may need to be used on all tracks carrying the same VVC bitstream.

Additionally, for example, a random access recovery point sample group may be defined. The random access recovery point sample group 'roll' specified in ISO/IEC 14496-12 can be used to provide information about recovery points for gradual decoding refresh. When the 'roll' sample group is used with a VVC track, the syntax and semantics of grouping_type_parameter may be specified the same as for the 'sap' sample group in ISO/IEC 14496-12. Additionally, layer_id_method_idc, which is equal to 0 and 1, can be used when the picture of the target layer of the sample mapped to the 'roll' sample group is a GDR picture. For example, if layer_id_method_idc is equal to 0, the 'roll' sample group can specify the behavior for all layers in the track. Additionally, for example, the semantics of layer_id_method_idc equal to 1 may be disclosed in Section 9.5.7 of ISO/IEC 14496-12. For example, layer_id_method_idc equal to 2 and 3 can be used when all pictures in the target layer of samples mapped to the 'roll' sample group are not GDR pictures, the following can be applied to pictures of the target layer that are not GDR pictures.

The referenced PPS has pps_mixed_nalu_types_in_pic_flag equal to 1.

For each subpicture index i in the range 0 to sps_num_subpics_minus1, both of the following can be true: sps_subpic_treated_aspic_flag[i] is 1, there is at least one IRAP subpicture that follows or has the same subpicture index i as the current sample in the same CLVS.

Also, for example, if layer_id_method_idc is equal to 2, the 'roll' sample group can specify the behavior for all layers in the track. Additionally, for example, the semantics of layer_id_method_idc equal to 3 may be disclosed in Section 9.5.7 of ISO/IEC 14496-12.

If the reader uses the sample indicated by layer_id_method_idc equal to 2 or 3 to start decoding, to ensure that bitstreams that start with samples marked as belonging to sample groups with layer_id_method_idc of 2 and 3 are matching bitstreams, the reader may need to further modify the SPS, PPS and PH NAL units of the restored bitstream as follows.

All SPS referenced in the sample may have sps_gdr_en-abled_flag equal to 1.

All PPS referenced in the sample may have pps_mixed_nalu_types_inpic_flag equal to 0.

All VCL NAL units of the AU restored from the sample may have the same nal_unit type as GDR_NUT.

All picture headers of AUs restored from samples may have a ph_gdr_pic_flag equal to 1 and a ph_recovery_poc_cnt value corresponding to the roll_distance of the 'roll' sample group description entry to which the sample is mapped.

Also, for example, if the 'roll' sample group is related to a dependent layer but not a reference layer, the sample group may represent characteristics that apply when all reference layers of the dependent layer are available and decoded. The sample group can be used to start decoding the predicted layer.

Additionally, for example, a layer information sample group may be defined. The list of layers and sublayers carried by a track can be signaled as a layer information ('linf') sample group. If the current track contains two or more layers, two or more sublayers, or one sublayer, but the sublayer is not a sublayer with TemporalId of 0, layer and sublayer information may be needed to interpret information signaled in different sample groups, such as 'sap', 'rap', 'sync'. 'tele', and 'vopi' sample groups. Additionally, if the 'linf' sample group exists in the VVC track, sub layer_pres-ence_flags may be equal to 0.

Additionally, for example, an operating points informa-tion sample group may be defined. Applications can use the operation point information sample group ('vopi') to be informed about the various operation points provided for the VVC elementary stream and configuration. Operation points may be related to output layer set, max TemporalId value, profile, tier, and level signaling. All of the above information can be captured by the 'vopi' sample group. In addition to the above information, the operation point information sample group may also provide dependency information between layers.

Additionally, for example, if more than one VVC track exists for a VVC elementary stream and an Operating Point entity group does not exist for the VVC elementary stream, both of the following may apply.

Among the VVC tracks for a VVC elementary stream, there can be only one track carrying the 'vopi' sample group.

All other VVC tracks in the VVC elementary stream MAY have a track reference of type 'vref' to the track carrying the 'vopi' sample group.

For a particular sample of a given track, temporally collocated samples of other tracks can be defined as having the same decoding time as the decoding time of that par-ticular sample. For each sample SN of track TN with a 'vref' track reference to track $T_k$ carrying the 'vopi' sample group, the following may apply.

If there is a temporally collocated sample $S_k$ of track $T_k$, the sample $S_N$ may be associated with the same 'vopi' sample group entry as the sample $S_k$.

Otherwise, the sample $S_N$ may be associated with a 'vopi' sample group entry equal to the last sample of the track $T_k$ preceding the sample $S_N$ at decoding time.

Additionally, if the VVC elementary stream refers to multiple VPS, multiple entries may need to be included in the sample group description box with grouping_type of 'vopi'. Additionally, if there is only one VPS, rather than using the default sample group description index and includ-ing it in each track fragment, it may be good to include an operating points information sample group in the sample table box. Additionally, grouping_type_parameter may not be defined for SampleToGroupBox whose grouping type is 'vopi'.

The 'vopi' sample group entry may include a VVC operation point record. The syntax of the VVC operation point record may be as shown in the table below.

TABLE 5

```
class VvcOperatingPointsRecord {
    unsigned int(8) num_profile_tier_level_minus1;
    for (i=0; i<=num_profile_tier_level_minus1; i++) {
        bit(5) reserved = 0;
        unsigned int(3) ptl_max_temporal_id[i];
        VvcPTLRecord(ptl_max_temporal_id[i]+1) ptl[i];
    }
    unsigned int(1) all_independent_layers_flag;
    if (all_independent_layers_flag){
        unsigned int(1) each_layer_is_an_ols_flag;
        bit(1) reserved = 0;
    } else
        unsigned int(2) ols_mode_idc;
    bit(2) reserved = 0;
    unsigned int(1) incomplete_operating_points_flag;
    unsigned int(1) num_ref_sublayer_for_ols_present_flag;
    unsigned int(9) num_olss;
    for (i=0; i<num_olss; i++) {
        unsigned int(8) ptl_idx[i];
        unsigned int(9) ols_idx[i];
        unsigned int(6) layer_count[i];
        bit(1) reserved = 0;
        for (j=0; j<layer_count[i]; j++) {
            unsigned int(6) layer_id[i][j];
            unsigned int(1) is_output_layer[i][j];
            bit(1) reserved = 0;
            if(!is_outputlayer[i][j] &&
num_ref_sublayer_for_ols_present_flag)
                unsigned int(8) num_ref_sublayers_in_layer_in_ols[i][j];
        }
    }
    bit(4) reserved = 0;
    unsigned int(12) num_operating_points;
```

TABLE 5-continued

```
    for (i=0; i<num_operating_points; i++) {
        unsigned int(9) ols_loop_entry_idx;
        unsigned int(3) max_temporal_id;
        unsigned int(1) frame_rate_info_flag;
        unsigned int(1) bit_rate_info_flag;
        if (incomplete_operating_points_flag) {
            unsigned int(1) op_availability_idc;
        }
        else
            bit(1) reserved = 0;
        bit(4) reserved = 0;
        unsigned int(2) chroma_format_idc;
        unsigned int(3) bit_depth_minus8;
        unsigned_int(16) max_picture_width;
        unsigned int(16) max_picture_height;
        if (frame_rate_info_flag) {
            unsigned int(16) avg_frame_rate;
            bit(6) reserved = 0;
            unsigned int(2) constant_frame_rate;
        }
        if (bit_rate_info_flag) {
            unsigned int(32) max_bit_rate;
            unsigned int(32) avg_bit_rate;
        }
    }
    if (!all_independent_layers_flag) {
        unsigned int(8) max_layer_count;
        for (i=0; i<max_layer_count; i++) {
            unsigned int(8) layer_id;
            unsigned int(8) num_direct_ref_layers;
            for (j=0; j<num_direct_ref_layers; j++)
                unsigned int(8) direct_ref_layer_id;
        }
    }
}
class VvcOperatingPointsInformation extends VisualSampleGroupEntry
('vopi') {
    VvcOperatingPointsRecord oinf;
}
```

Additionally, semantics for the syntax of the VVC operation point record may be as shown in the table below.

TABLE 6 num_profile_tier_level_minus1 plus 1 gives the number of the subsequent profiles, tier, and level combinations as well as the associated fields.
ptl_max_temporal_id[i]: Gives the maximum TemporalID of NAL units of the associated bitstream for the specified i-th profile, tier, and level structure.
 NOTE: The semantics of ptl_max_temporal_id[i] and max_temporal_id of an operating point, given below, are different even though they can carry the same numerical value.
ptl[i] specifies the i-th profile, tier, and level structure.
all_independent_layers_flag, each_layer_is_an_ols_flag, ols_mode_idc and max_tid_il_ref_pics_plus1 are defined in ISO/IEC 23090-3.
incomplete_operating_points_flag equal to 1 specifies that some operating points declared in the structure may be incomplete (i.e., some output layer sets or temporal sublayers may be missing in some operating points). incomplete_operating_points_flag equal to 0 specifies that all operating points declared in the structure are complete (i.e., all output layer sets and temporal sublayers associated with the operating points are present in the file).
num_ref_sublayer_for_ols_present_flag equal to 1 specifies syntax element num_ref_sublayers_in_layer_in_ols[i][j] may be present. num_ref_sublayer_for_ols_present_flag equal to 0 specifies that syntax element num_ref_sublayers_in_layer_in_ols[i][j] is not present.
num_olss specifies the number of output layer sets signalled in this syntax structure. The value of num_olss shall be less than or equal to the value of TotalNumOlss as specified in ISO/IEC 23090-3.
ptl_idx[i] specifies the zero-based index of the listed profile, tier, and level structure for the i-th output layer set signalled in this syntax structure.
ols_idx[i] is the output layer set index of the i-th output layer set signalled in this syntax structure.
layer_count[i] specifies the number of layers in the i-th output layer set signalled in this syntax structure.
layer_id[i][j] specifies the nuh_layer_id value for the j-th layer in the i-th output layer set signalled in this syntax structure.

TABLE 6-continued is_output_layer[i][j] equal to 1 specifies that the j-th layer is an output
    layer in the i-th output layer set signalled in this syntax structure.
    is_output_layer[i][j] equal to 0 specifies that the j-th layer in not an output layer
    in the i-th output layer set signalled in this syntax structure.
num_ref_sublayers_in_layer_in_ols[i][j] equal to 0 specifies that the
    pictures of the layer with layer Id equal to layer_id[i][j] that are neither
    IRAP pictures nor GDR pictures with ph_recovery_poc_cnt equal to 0 are not
    used as inter-layer reference pictures for decoding of pictures of other layers in
    the output layer set. num_ref_sublayers_in_layer_in_ols[i][j]
    greater than 0 specifies that, for decoding pictures of the other layers of the
    output layer set, no picture from the layer with layer Id equal to
    layer_id[i][j] with TemporalId greater than
    num_ref_sublayers_in_layer_in_ols[i][j] - 1 is used as inter-
    layer reference picture and no APS with nuh_layer_id equal to
    layer_id[i][j] and TemporalId greater than
    num_ref_sublayers_in_layer_in_ols[i][j] - 1 is referenced. When
    not present, the value of num_ref_sublayers_in_layer_in_ols[i][j]
    is inferred to be equal to 7.
num_operating_points gives the number of operating points for which the
    information follows. The list of operating points shall include all operating
    points that are present in sample entry of tracks representing the bitstream.
ols_loop_entry_idx is the index to the list of output layer sets signalled in
    this syntax structure for the operating point. The variable olsIdx is set equal to
    ols_idx[ ols_loop_entry_idx ]for the present loop entry.
max_temporal_id indicates the maximum TemporalId of NAL units of this
    operating point.
frame_rate_info_flag equal to 0 indicates that no frame rate information is
    present for the operating point. The value 1 indicates that frame rate
    information is present for the operating point.
bit_rate_info_flag equal to 0 indicates that no bitrate information is present
    for the operating point. The value 1 indicates that bitrate information is present
    for the operating point.
op_availability_idc indicates whether some output layer sets or some
    temporal sublayers are missing for an operating point.
    op_availability_idc equal 0 indicates that the operating point is missing.
    op_availability_idc equal 1 indicates that some temporal sublayers for
    the operating point are missing but some temporal sublayers remain, allowing
    the operating point to be played. When op_availability_idc is equal to 1,
    the maximum TemporalId of NAL units of the operating point is then the one
    indicated in the layer information of the set of tracks needed for decoding the
    operating point. [Ed. (HD): This semantics seems to mean that when the value
    of incomplete_operating_points_flag is equal to 1, all operating point
    in this structure is incomplete, either all layers / sublayers are missing / not
    available or some temporal sublayers are missing. This might be different from
    the intent such that when incomplete_operating_points_flag is equal
    to 1, some, but not necessarily all, operating points are incomplete]
chroma_format_idc indicates the chroma format that applies to this operating
    point. The following constraints apply for chroma_format_idc:
        -    If this operating point contains only one layer, the value of
            sps_chroma_format_idc, as defined in ISO/IEC 23090-3, shall be the
            same in all SPSs referenced by the VCL NAL units in the VVC
            bitstream of this operating point, and the value of
            chroma_format_idc shall be equal to that value of
            sps_chroma_format_idc.
        -    Otherwise (this operating point contains more than one layer), the
            value of chroma_format_idc shall be equal to the value of
            vps_ols_dpb_chroma_format[ MultiLayerOlsIdx[ olsIdx ] ], as defined
            in ISO/IEC 23090-3.
bit_depth_minus8 indicates the bit depth that applies to this operating point.
    The following constraints apply for bit_depth_minus8:
        -    If this operating point contains only one layer, the value of
            sps_bitdepth_minus8, as defined in ISO/IEC 23090-3, shall be the
            same in all SPSs referenced by the VCL NAL units in the VVC
            bitstream of this operating point, and the value of
            bit_depth_minus8 shall be equal to that value of
            sps_bitdepth_minus8.
        -    Otherwise(this operating point contains more than one layer), the
            value of bit_depth_minus8 shall be equal to the value of
            vps_ols_dpb_bitdepth_minus8[ MultiLayerOlsIdx[ olsIdx ] ], as
            defined in ISO/IEC 23090-3.
max_picture_width indicates the maximum picture width, in units of luma
    samples, that applies to this operating point. The following constraints apply for
    max_picture_width:
        -    If this operating point contains only one layer, the value of
            sps_pic_width_max_in_luma_samples, as defined in ISO/IEC 23090-3,
            shall be the same in all SPSs referenced by the VCL NAL units in the
            VVC bitstream of this operating point, and the value of
            max_picture_width shall be equal to that value of
            sps_pic_width_max_in_luma_samples.
        -    Otherwise (this operating point contains more than one layer), the TABLE 6-continued value of max_picture_width shall be equal to the value of
vps_ols_dpb_pic_width[ MultiLayerOlsIdx[ olsIdx ] ], as defined in
ISO/IEC 23090-3.
max_picture_height indicates the maximum picture height, in units of luma
samples, that applies to this operating point. The following constraints apply for
max_picture_height:
    -    If this operating point contains only one layer, the value of
        sps_pic_height_max_in_luma_samples, as defined in ISO/IEC 23090-
        3, shall be the same in all SPSs referenced by the VCL NAL units in
        the VVC bitstream of this operating point, and the value of
        max_picture_height shall be equal to that value of
        sps_pic_height_max_in_luma_samples.
    -    Otherwise (this operating point contains more than one layer), the
        value of max_picture_height shall be equal to the value of
        vps_ols_dpb_pic_height[ MultiLayerOlsIdx[ olsIdx ] ], as defined in
        ISO/IEC 23090-3.
avg_frame_rate gives the average frame rate in units of frames/(256 seconds)
    for the operating point. Value 0 indicates an unspecified average frame rate.
    When the bitstream of the operating point contains multiple layers, this gives
    the average access unit rate.
constant_frame_rate equal to 1 indicates that the bitstream of the operating
    point is of constant frame rate. Value 2 indicates that the representation of each
    sublayer in the bitstream of the operating point is of constant frame rate. Value
    0 indicates that the bitstream of the operating point may or may not be of
    constant frame rate. constant_frame_rate equal to 3 is reserved. When
    the bitstream of the operating point contains multiple layers, this gives the
    indication of whether the bitstream of the operating point has constant access
    unit rate.
max_bit_rate gives the maximum bit rate in bits/second of the bitstream of the
    operating point, over any window of one second.
avg_bit_rate gives the average bit rate in bits/second of the bitstream of the
    operating point.
max_layer_count specifies the count of all unique layers in all of the operating
    points described in the sample group entry.
layer_id specifies nuh_layer_id of a layer for which all the direct reference layers
    are given in the following loop of direct_ref_layer_id.
num_direct_ref_layers specifies the number of direct reference layers for
    the layer with nuh_layer_id equal to layer_id. When
    all_independent_layers_flag is equal to 1,
    num_direct_ref_layers is inferred to be equal to 0 for each layer.
direct_ref_layer_id indicates nuh_layer_id of the direct reference layer.
max_tid_il_ref_pics_plus1 equal to 0 specifies that the pictures of the layer
    with nuh_layer_id equal to direct_ref_layer_id that are neither IRAP
    pictures nor GDR pictures with ph_recovery_poc_cnt equal to 0 are not used as
    inter-layer reference pictures for decoding of pictures of the layer with
    nuh_layer_id equal to layer_id. A value greater than 0 specifies that, for
    decoding pictures of the layer with nuh_layer_id equal to layer_id, no picture
    from the layer with nuh_layer_id equal to direct_ref_layer_id with
    TemporalId greater than max_tid_il_ref_pics_plus1 - 1 is used as an
    inter-layer reference picture and no APS with nuh_layer_id equal to
    direct_ref_layer_id and TemporalId greater than
    max_tid_il_ref_pics_plus1 - 1 isreferenced.

Additionally, for example, an access unit delimiter sample group may be defined. The sample group description entry of the sample group may include an AUD NAL unit.

If the sample is mapped to the access unit limiter sample group ('aud'), if the target operation point corresponds to one of the output layer sets indicated within the 'aud' sample group, it may indicate that the AUD NAL unit contained within the sample group should be inserted into the restored AU.

The syntax of the AUD sample entry of the access unit delimiter sample group may be as shown in the table below.

TABLE 7 class AUDSampleEntry( ) extends VisualSampleGroupEntry ('aud ')
{
   unsigned int(9) ols_idx;
   unsigned int(1) lower_ols_idx_inclusive;
   unsigned int(6) reserved;
   bit(24) audNalUnit;
}

Additionally, the semantics for the syntax of the AUD sample entry may be as shown in the table below.

TABLE 8 ols_idx indicates the OLS, which the sample group applies to.
lower_ols_idx_inclusive equal to 0 indicates that the sample group applies
    only to the OLS with index equal to ols_idx. lower_ols_idx_inclusive
    equal to 1 indicates that the sample group applies to any OLS with index from 0 to
    ols_idx, inclusive.
audNalUnit contains an AUD NAL unit as specified in ISO/IEC 23090-3.

Additionally, for example, an end of sequence sample group may be defined. The sample group description entry of the sample group may include an EQS NAL unit.

If a sample maps to an end-of-sequence sample group ('eos'), if the target operation point corresponds to one of the output layer sets and maximum, temporal ID indicated within the 'eos' sample group, it may indicate that the EQS NAL unit included in the sample group should be inserted into the indicated position of the restored AU.

The syntax of the sequence end sample entry of the sequence end sample group may be as shown in the table below.

TABLE 9

```
class EndOfSequenceSampleEntry( ) extends VisualSampleGroupEntry
('eos ')
{
    unsigned int(9) ols_idx;
    unsigned int(3) max_tid;
    unsigned int(1) lower_ols_idx_inclusive;
    unsigned int(11) eos_position;
    bit(16) eosNalUnit;
}
```

Additionally, semantics for the syntax of the end-of-sequence sample entry may be as shown in the following table.

TABLE 10 ols_idx and max_tid indicate the operating point, which the sample group applies to.
lower_ols_idx_inclusive equal to 0 indicates that the sample group applies only to the operating point with OLS index equal to ols_idx.
    lower_ols_idx_inclusive equal to 1 indicates that the sample group applies to any OLS with index from 0 to ols_idx, inclusive.
eos_position indicates the index of the NAL unit of the reconstructed access unit after which the EOS NAL unit is placed in the reconstructed bitstream.
eosNalUnit contains an EOS NAL unit as specified in ISO/IEC 23090-3.

Additionally, for example, an End of bitstream sample group may be defined. The sample group description entry of the sample group may include an EOB NAL unit.

If the sample maps to a bitstream end sample group ('eob'), if the target operation point corresponds to one of the output layer sets and maximum temporal ID indicated within the 'eob' sample group, it may indicate that the EOB NAL unit included in the sample group should be inserted into the restored AU.

The syntax of the bitstream end sample entry of the bitstream end sample group may be as shown in the table below.

TABLE 11

```
class EndOfBitstreamSampleEntry( ) extends VisualSampleGroupEntry
('eob ')
{
    unsigned int(9) ols_idx;
    unsigned int(3) max_tid;
    unsigned int(1) lower_ols_idx_inclusive;
    unsigned int(3) reserved;
    bit(16) eobNalUnit;
}
```

Additionally, semantics for the syntax of the bitstream end sample entry may be as shown in the following table.

TABLE 12 ols_idx and max_tid indicate the operating point, which the sample group applies to.

lower_ols_idx_inclusive equal to 0 indicates that the sample group applies only to the operating point with OLS index equal to ols_idx.

lower_ols_idx_inclusive equal to 1 indicates that the sample group applies to any OLS with index from 0 to ols_idx, inclusive.

eobNalUnit contains an EOB NAL unit as specified in ISO/IEC 23090-3.

Meanwhile, when the target operation point is changed as described above, the current VVC file format specifies the following.

TABLE 13

| |
| --- |
| 4) When both of the following conditions are true: |
| - the sequence of access units is followed by a selection a different operating point than what was selected earlier, and |
| - the sequence of access units does not end with EOS NAL units in each layer of the applied operating point or an EOB NAL unit, |
| the file reader shall include an EOS NAL unit in each layer of the applied operating point into the output bitstream. |

As shown in Table 13 above, if both of the following two conditions are true, the file reader may need to include an EOS NAL unit in each layer of the operation point applied as the output bitstream.

Following the sequence of access units, an operation point different from the previous operation point is selected.

The sequence of access units does not end with an EOS NAL unit or an EOB NAL unit in each layer of the applied operation point.

However, the above process may cause at least the following problems.

First, the target operating point has two components including target OLS and maximum temporal ID, even if only the maximum temporal ID changes, the target operation point is considered to have changed, but there may be no need to call the above-described process. The change in the maximum temporal ID may occur smoothly in response to a change in network status. Accordingly, a method may be proposed so that the process is invoked only when the change is related to the target OLS.

Second, the process requires the file reader to include an EOS NAL unit as the output bitstream in each layer of the applied operation point, this may mean that the file reader must be able to place the EOS NAL unit in the appropriate location within the access unit. This may be burden. Because VVC allows an EOS NAL unit to exist anywhere within an access unit as long as it does not precede the associated picture unit, there is no need for a file parser to put EOS in the correct layer.

Accordingly, this document proposes a solution to the above-mentioned problem. The proposed embodiments can be applied individually or in combination.

As a first example, instead of calling the process to insert the EOS NAL unit when the target operation point changes, this document proposes a method of calling the process for inserting the EOS NAL unit only when the target OLS changes. Therefore, if only the maximum temporal ID is changed, the process can be skipped.

As a second example, when inserting an EOS NAL unit in the above process, this document proposes a method to allow a file parser to include EOS NAL units as many as the number of layers in the target OLS without having to place them in corresponding layers.

As a third example, this document proposes a method to allow all necessary EOS NAL units to be placed at the end of the access unit.

As a fourth example, this document proposes making the above process optional.

As an example, an embodiment reflecting the first to third examples proposed in this document may be as follows. The above embodiment can be expressed as a VVC file format specification as shown in the table below.

TABLE 14

| |
| --- |
| 4) When both of the following conditions are true: |
| - the sequence of access units is followed by a selection a different output layer set than what was selected earlier, and |
| - the sequence of access units does not end with EOS NAL units in each layer of the applied output layer set or an EOB NAL unit, |
| the file reader shall include EOS NAL units in the last access unit as many as the number of layers applied to the target output layer. The included EOS NAL units may be placed at the end of the access unit in the increasing order of the layer id of the NAL units. |

For example, according to Table 14 above, it can be determined whether the following two conditions are true. For example, the first condition may be whether an OLS that is different from the previous output layer set (OLS) is selected following the sequence of access units. Also, for example, the second condition may be whether the sequence of access units does not end with an EOS NAL unit or an EOB NAL unit in each layer of the applied OLS.

If the above two conditions are true, that is, after the sequence of access units, an OLS different from the previous OLS is selected, if the sequence of access units does not end with an EOS NAL unit or an EOB NAL unit in each layer of the applied OLS, the file reader can include EOS NAL units in the last access unit as many layers as the number of layers applied to the target output layer applied as the output bitstream. The included EOS NAL unit may be placed at the end of the access unit in ascending order of the layer ID of the NAL unit.

As another example, an embodiment reflecting the first to fourth examples proposed in this document may be as follows. The above embodiment can be expressed as a VVC file format specification as shown in the table below.

TABLE 15

4) When both of the following conditions are true:
- the sequence of access units is followed by a selection a different output layer set than what was selected earlier, and
- the sequence of access units does not end with EOS NAL units in each layer of the applied output layer set or an EOB NAL unit,
 the file reader may include EOS NAL units in the last access unit as many as the number of layers applied to the target output layer. The included EOS NAL units may be placed at the end of the access unit in the increasing order of the layer id of the NAL units.

For example, according to Table 15 above, it can be determined whether the following two conditions are true. For example, the first condition may be whether an OLS that is different from the previous output layer set (OLS) is selected following the sequence of access units. Also, for example, the second condition may be whether the sequence of access units does not end with an EOS NAL unit or an EOB NAL unit in each layer of the applied OLS.

If the above two conditions are true, that is, after the sequence of access units, an OLS different from the previous OLS is selected, if the sequence of access units does not end with an EOS NAL unit or an EOB NAL unit in each layer of the applied OLS, the file reader can include EOS NAL units in the last access unit as many layers as the number of layers applied to the target output layer applied as the output bitstream. The process of including the EOS NAL unit may be optional. The included EOS NAL unit may be placed at the end of the access unit in ascending order of the layer ID of the NAL unit.

Figure 8:
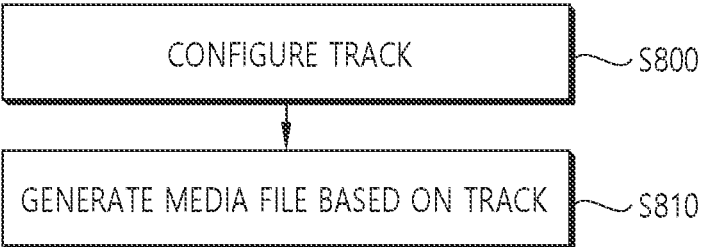
FIG. 8 exemplarily illustrates a method for generating a media file to which an embodiment proposed in the present disclosure is applied.

FIG. 8 illustrates a media file generation method to which an embodiment proposed in the present disclosure is applied.

Referring to FIG. 8, a first apparatus may configure a track (S800). For example, the first apparatus may configure the track according to the foregoing embodiment. For example, the first apparatus may refer to a transmission end, an encoding end, or a media file generating end. For example, the first apparatus may configure subpicture tracks and a base track. The first apparatus may include an encoder.

The first apparatus may generate a media file based on the track (S810). For example, the first apparatus may generate the media file based on the track according to the foregoing embodiment.

Figure 9:
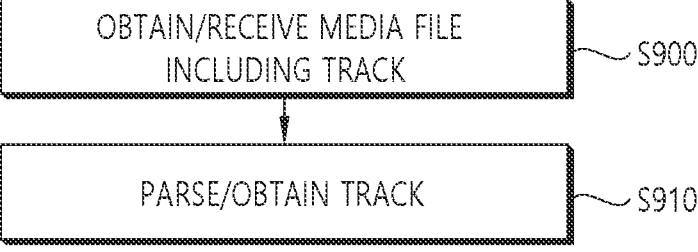
FIG. 9 exemplarily illustrates a method for decoding a media file generated by applying the embodiment proposed in the present disclosure.

FIG. 9 illustrates a method for decoding a media file generated by applying an embodiment proposed in the present disclosure.

Referring to FIG. 9, a second apparatus may obtain/receive a media file including a track (S900). For example, the second apparatus may obtain/receive the media file including the track according to the foregoing embodiment. For example, the second apparatus may refer to a reception end, a decoding end, or a rendering end.

For example, the media file may include information described in Table 1, Table 3, Table 5, Table 7, Table 9, and/or Table 11.

The second apparatus may parse/obtain the track (S910). The second apparatus may parse/obtain tracks included in the media file. For example, the track may include a subpicture track or a base track. For example, the second apparatus may parse the subpicture track and the base track.

The second apparatus may generate a slice of one or more subpictures based on the track. The second apparatus may generate reconstructed samples based on the track. The second apparatus may obtain information required for image/video decoding based on the track.

Figure 10:
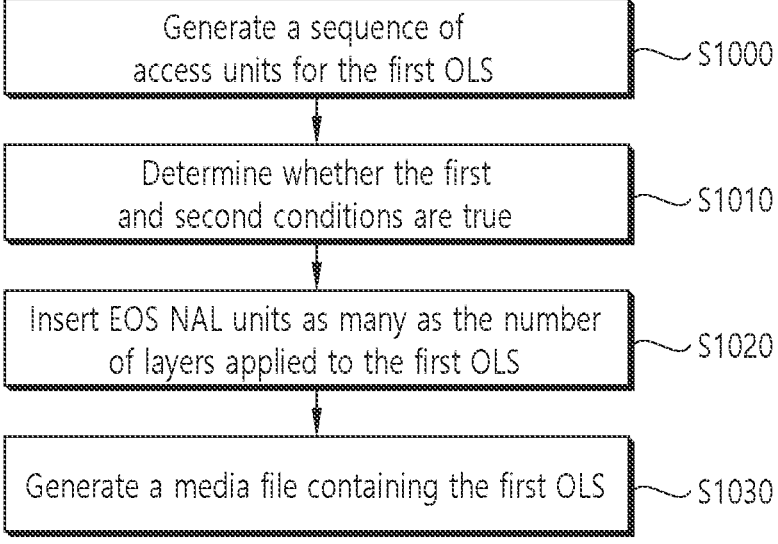
FIG. 10 schematically illustrates a method for generating a media file by an apparatus for generating a media file according to the present disclosure.

FIG. 10 schematically shows a method of creating a media file by the media file generating device according to this document. The method disclosed in FIG. 10 can be performed by the media file creation device disclosed in FIG. 11. The media file creation device may represent the first device described above. Specifically, for example, S1000 to S1030 of FIG. 10 may be performed by the media file creation unit of the media file creation device. Additionally, although not shown, the process of encoding a bitstream including video information may be performed by an encoder. The encoder may be included in the media file creation device or may be configured as an external component.

The media file generating device generates a sequence of access units for a first Output Layer Set (OLS) (S1000). For example, a media file generating device can derive a bitstream including encoded video information and generate a media file for the bitstream. For example, a media file creation device can obtain the encoded video information through a network or (digital) storage medium. Here, the network may include a broadcasting network and/or a communication network, and the digital storage medium may include various storage media such as USB, SD, CD, DVD, Blu-ray, HDD, and SSD. Or, for example, the media file generating device may include an encoder and derive the encoded video information. For example, a media file generating device may generate the first OLS for a bitstream including the encoded video information. For example, a media file generating device may generate a sequence of access units for the first OLS.

The media file creation device determines whether the first condition and the second condition are true (S1010). The media file generating device may determine whether the first condition and the second condition are true.

For example, the first condition may be whether an OLS different from the first OLS is selected following the sequence of access units. That is, for example, if an OLS different from the first OLS is selected following the sequence of access units, the first condition may be determined to be true. Meanwhile, for example, an OLS different from the first OLS may be referred to as a second OLS.

Also, for example, the second condition may be whether the sequence of the access units does not end with an EOS NAL unit or does not end with an End Of Bitstream (EOB) NAL unit in each layer of the first OLS. That is, for example, if the sequence of access units does not end with an EOS NAL unit or does not end with an End Of Bitstream (EOB) NAL unit in each layer of the first OLS, the second condition may be determined to be true.

Based on the first condition and the second condition being true, the media file generating device inserts End Of Sequence (EOS) Network Abstraction Layer (NAL) units equal to the number of layers applied to the first OLS (S1020). For example, if the first condition and the second condition are true, the media file generating device may insert End Of Sequence (EOS) Network Abstraction Layer (NAL) units into the first OLS equal to the number of layers applied to the first OLS.

Also, for example, the EOS NAL units may not be placed in the corresponding layer.

Additionally, for example, the media file generating device may insert the inserted EOS NAL units at the end of the last access unit of the sequence in ascending order of the layer IDs of the EOS NAL units. Additionally, for example, the inserted EOS NAL units may be placed at the end of the access unit of the sequence in ascending order of the layer IDs of the EOS NAL units.

Additionally, for example, if an OLS different from the first OLS is not selected after the sequence of the generated access units and only the target operation point is changed, the EOS NAL units may not be inserted. For example, if an OLS different from the first OLS is not selected after the sequence of the generated access units, and only the maximum temporal ID is changed, the EOS NAL units may not be inserted.

The media file generating device generates a media file including the first OLS (S1030). The media file generating device may generate a media file including the first OLS and/or the second OLS.

Meanwhile, although not shown, a media file generating device may generate the second OLS. For example, a media file creation device may generate a sequence of access units for the second OLS. Additionally, although not shown, the media file generating device may store the generated media file in a (digital) storage medium or transmit it to the media file processing device through a network or (digital) storage medium. Here, the network may include a broadcasting network and/or a communication network, and the digital storage medium may include various storage media such as USB, SD, CD, DVD, Blu-ray, HDD, and SSD.

Figure 11:
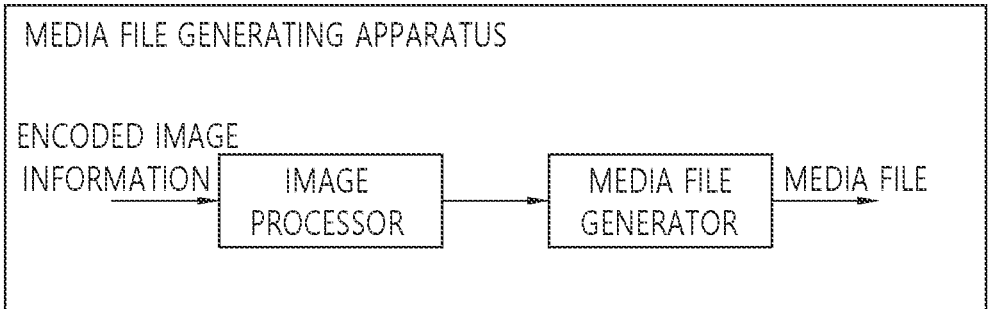
FIG. 11 schematically illustrates an apparatus for generating a media file, which performs a method for generating a media file according to the present disclosure.

FIG. 11 schematically shows a media file generating device that performs the media file generating method according to this document. The method disclosed in FIG. 10 can be performed by the media file creation device disclosed in FIG. 11. Specifically, for example, the media file generating unit of the media file generating device of FIG. 11 may perform steps S1000 to S1030. Additionally, although not shown, the process of encoding a bitstream including video information may be performed by an encoder of the media file creation device.

Figure 12:
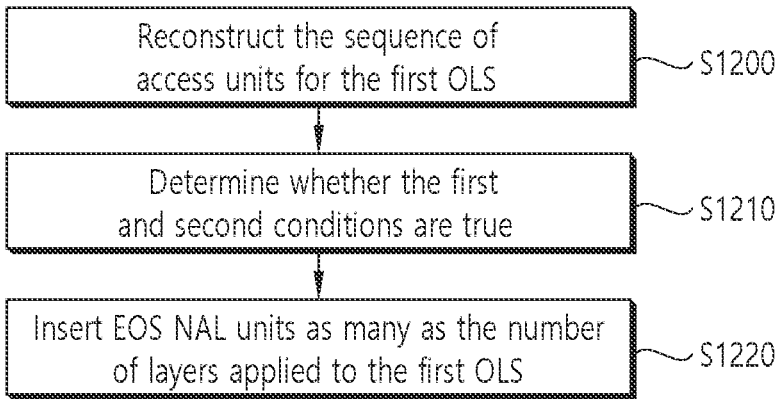
FIG. 12 schematically illustrates a method for processing a media file by an apparatus for processing a media file according to the present disclosure.

FIG. 12 schematically shows a media file processing method by the media file processing device according to this document. The method disclosed in FIG. 12 may be performed by the media file processing device disclosed in FIG. 13. The media file processing device may represent the second device described above. For a specific example, S1200 to S1220 of FIG. 12 may be performed by the media file processing unit of the media file processing device. The media file processing unit may include a file parser and/or a file reader. Additionally, although not shown, the process of acquiring the media file may be performed by the receiving unit, the process of deriving a bitstream including a sequence of access units for the first OLS and a sequence of access units for an OLS different from the first OLS may be performed by a media file processing unit, the process of decoding the bitstream may be performed by a decoder. The decoder may be included in the media file processing device or may be configured as an external component.

The media file processing device restores the sequence of access units for the first Output Layer Set (OLS) (S1200). For example, the media file processing device may obtain media files through a network or (digital) storage medium. The media file may include the sequence of access units for the first OLS. A media file processing device may reconstruct the sequence of the access units for the first OLS. Here, the network may include a broadcasting network and/or a communication network, and the digital storage medium may include various storage media such as USB, SD, CD, DVD, Blu-ray, HDD, and SSD.

The media file processing device determines whether the first condition and the second condition are true (S1210). The media file processing device may determine whether the first condition and the second condition are true.

For example, the first condition may be whether an OLS different from the first OLS is selected following the sequence of access units. That is, for example, if an OLS different from the first OLS is selected following the sequence of access units, the first condition may be determined to be true. Meanwhile, for example, an OLS different from the first OLS may be referred to as a second OLS.

Also, for example, the second condition may be whether the sequence of the access units does not end with an EOS NAL unit or does not end with an End Of Bitstream (EOB) NAL unit in each layer of the first OLS. That is, for example, if the sequence of access units does not end with an EOS NAL unit or does not end with an End Of Bitstream (EOB) NAL unit in each layer of the first OLS, the second condition may be determined to be true.

Based on the first condition and the second condition being true, the media file processing device inserts End Of Sequence (EOS) Network Abstraction Layer (NAL) units equal to the number of layers applied to the first OLS (S1220). For example, if the first condition and the second condition are true, the media file processing device may insert End Of Sequence (EOS) Network Abstraction Layer (NAL) units into the first OLS equal to the number of layers applied to the first OLS.

Also, for example, the EOS NAL units may not be placed in the corresponding layer.

Additionally, for example, the media file processing device may insert the inserted EOS NAL units at the end of the last access unit of the sequence in ascending order of the layer IDs of the EOS NAL units. Additionally, for example, the inserted EOS NAL units may be placed at the end of the access unit of the sequence in ascending order of the layer IDs of the EOS NAL units.

Additionally, for example, if an OLS different from the first OLS is not selected after the sequence of the restored access units and only the target operation point is changed, the EOS NAL units may not be inserted. For example, if an OLS different from the first OLS is not selected after the sequence of restored access units, and only the maximum temporal ID is changed, the EOS NAL units may not be inserted.

Meanwhile, although not shown, the media file processing device may restore the sequence of the access unit for the second OLS. Additionally, the media file processing device may derive a bitstream including a sequence of access units for the first OLS and a sequence of access units for the second OLS, and may decode the bitstream. The bitstream may be called a VVC bitstream or an output bitstream. For example, a media file processing device can decode video information in the bitstream and generate a restored picture based on the video information.

Figure 13:
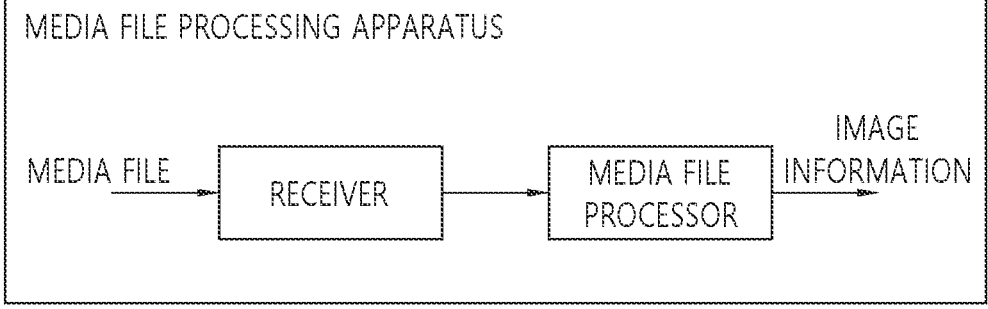
FIG. 13 schematically illustrates an apparatus for processing a media file, which performs a method for processing a media file according to the present disclosure.

FIG. 13 schematically shows a media file processing device that performs the media file processing method according to this document. The method disclosed in FIG. 12 may be performed by the media file processing device disclosed in FIG. 13. Specifically, for example, the media file processing unit of the media file processing device of FIG. 12 may perform steps S1200 to S1220 of FIG. 12. Meanwhile, although not shown, the media file processing device may include a decoder, the process of acquiring the media file may be performed by the receiving unit, the process of deriving a bitstream including a sequence of access units for the first OLS and a sequence of access units for an OLS different from the first OLS may be performed by a media file processing unit, the process of decoding the bitstream may be performed by a decoder.

According to this document described above, even if only the maximum temporal ID is changed, unnecessary operations of inserting EOS NAL units can be prevented, thereby improving overall coding efficiency.

In addition, according to this document, it is possible to prevent burden that occurs when inserting an EOS NAL unit into an appropriate location within an access unit, thereby improving overall coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a micro-processor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM. EPROM, EEPROM. RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 14:
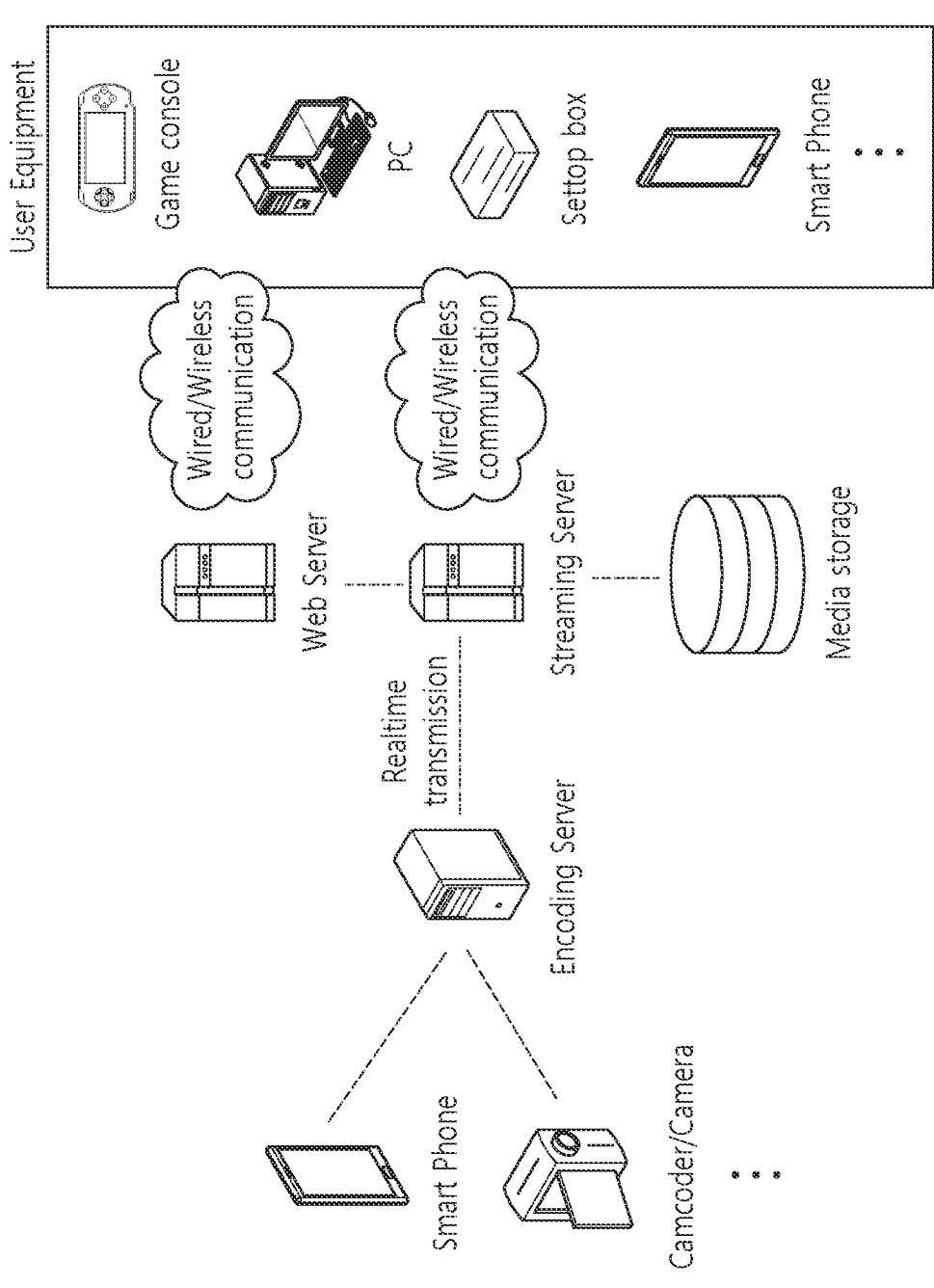
FIG. 14 illustrates a structural diagram of a contents streaming system to which the present disclosure is applied.

FIG. 14 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A method for processing a media file, the method comprising:
   reconstructing a sequence of access units for a first Output Layer Set (OLS);

determining whether a first condition and a second condition are true; and
   based on the first condition and the second condition being true, inserting End Of Sequence (EOS) Network Abstraction Layer (NAL) units as many as a number of layers applied to the first OLS,
   wherein the first condition is whether an OLS different from the first OLS is selected following the sequence of the access units,
   wherein the second condition is whether the sequence of the access units does not end with an EOS NAL unit or an End Of Bitstream (EOB) NAL unit in each layer of the first OLS, and
   wherein the inserted EOS NAL units are arranged at an end of an access unit of the sequence in ascending order of layer IDs of the EOS NAL units.

2. A media file processing apparatus for performing a media file processing method, comprising:
   a receiver which acquires a media file; and
   a media file processor which reconstructs a sequence of access units for a first Output Layer Set (OLS) of the media file, determines whether a first condition and a second condition are true, and based on the first condition and the second condition being true, inserts End Of Sequence (EOS) Network Abstraction Layer (NAL) units as many as a number of layers applied to the first OLS,
   wherein the first condition is whether an OLS different from the first OLS is selected following the sequence of the access units,
   wherein the second condition is whether the sequence of the access units does not end with an EOS NAL unit or an End Of Bitstream (EOB) NAL unit in each layer of the first OLS, and
   wherein the inserted EOS NAL units are arranged at an end of an access unit of the sequence in ascending order of layer IDs of the EOS NAL units.

3. A method for generating a media file, the method comprising:
   generating a sequence of access units for a first Output Layer Set (OLS);
   determining whether a first condition and a second condition are true;
   based on the first condition and the second condition being true, inserting End Of Sequence (EOS) Network Abstraction Layer (NAL) units as many as a number of layers applied to the first OLS; and
   generating the media file including the first OLS,
   wherein the first condition is whether an OLS different from the first OLS is selected following the sequence of the access units,
   wherein the second condition is whether the sequence of the access units does not end with an EOS NAL unit or an End Of Bitstream (EOB) NAL unit in each layer of the first OLS, and
   wherein the inserted EOS NAL units are arranged at an end of an access unit of the sequence in ascending order of layer IDs of the EOS NAL units.

* * * * *